United States Patent
Lee et al.

(10) Patent No.: US 10,606,440 B2
(45) Date of Patent: Mar. 31, 2020

(54) IMAGE DISPLAY APPARATUS AND METHOD OF DISPLAYING AND CHANGING ATTRIBUTES OF HIGHLIGHTED ITEMS

(71) Applicant: SAMSUNG ELECTRONICS CO., LTD., Suwon-si (KR)

(72) Inventors: Jin-ha Lee, Seoul (KR); Jang-won Seo, Seoul (KR); Jun-Seong Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 414 days.

(21) Appl. No.: 14/962,034

(22) Filed: Dec. 8, 2015

(65) Prior Publication Data

US 2016/0196035 A1 Jul. 7, 2016

(30) Foreign Application Priority Data

Jan. 5, 2015 (KR) .................. 10-2015-0000867

(51) Int. Cl.
*G06F 3/0482* (2013.01)
*G06F 3/0481* (2013.01)
*G06F 3/0346* (2013.01)

(52) U.S. Cl.
CPC ........ *G06F 3/04812* (2013.01); *G06F 3/0346* (2013.01); *G06F 3/0482* (2013.01); *G06F 2203/04804* (2013.01)

(58) Field of Classification Search
CPC .... G06F 3/0312; G06F 3/0481; G06F 3/0346; G06F 3/0308
See application file for complete search history.

(56) References Cited

U.S. PATENT DOCUMENTS

| 5,687,331 A | 11/1997 | Volk et al. |
| 5,956,035 A | 9/1999 | Sciammarella et al. |
| 6,157,379 A * | 12/2000 | Singh .................. G06F 3/04886 345/173 |
| 6,874,129 B2 | 3/2005 | Smith |
| 9,684,436 B2 | 6/2017 | Ording et al. |
| 9,864,499 B2 | 1/2018 | Nakagawa |
| 2002/0171675 A1 | 11/2002 | Fox et al. |

(Continued)

FOREIGN PATENT DOCUMENTS

| CN | 1425151 A | 6/2003 |
| CN | 1798295 A | 7/2006 |

(Continued)

OTHER PUBLICATIONS

Screenshot of "2014 LG Smart TV with webOS" (Published on Jan. 9, 2014) https://www.youtube.com/watch?v=_MixY8STn0l.*

(Continued)

*Primary Examiner* — Rinna Yi
(74) *Attorney, Agent, or Firm* — Sughrue Mion, PLLC

(57) ABSTRACT

An image display apparatus and an image display method are provided. The image display method includes displaying an item list including items, and a cursor indicating a position of a user input for moving the cursor. The image display method further includes sensing the user input, moving the cursor based on the user input, and changing a gap between a first item and a second item adjacent to the first item, among the items, based on a positional relationship between the cursor and the first item.

27 Claims, 19 Drawing Sheets

(56) References Cited

U.S. PATENT DOCUMENTS

| | | | |
|---|---|---|---|
| 2002/0171690 | A1 | 11/2002 | Fox et al. |
| 2003/0013493 | A1* | 1/2003 | Irimajiri .............. G06F 1/1616 455/566 |
| 2006/0143657 | A1 | 6/2006 | Song |
| 2006/0294545 | A1 | 12/2006 | Morris et al. |
| 2007/0229465 | A1* | 10/2007 | Sakai .................... G08C 17/00 345/173 |
| 2007/0288860 | A1 | 12/2007 | Ording et al. |
| 2008/0043128 | A1 | 2/2008 | Poonnen et al. |
| 2009/0006938 | A1* | 1/2009 | Yoo ................... G06F 17/30899 715/205 |
| 2009/0249203 | A1 | 10/2009 | Tsuruta et al. |
| 2010/0175027 | A1 | 7/2010 | Young et al. |
| 2011/0221776 | A1 | 9/2011 | Shimotani et al. |
| 2013/0127731 | A1 | 5/2013 | Song et al. |
| 2013/0227486 | A1 | 8/2013 | Brinda |
| 2014/0033024 | A1 | 1/2014 | Gartland et al. |
| 2014/0292760 | A1 | 10/2014 | Shikolay |
| 2016/0269795 | A1 | 9/2016 | Ci et al. |

FOREIGN PATENT DOCUMENTS

| | | |
|---|---|---|
| CN | 101185323 A | 5/2008 |
| CN | 103546822 A | 1/2014 |
| CN | 104182130 A | 12/2014 |
| EP | 2146269 A1 | 1/2010 |
| JP | 2001-516484 A | 9/2001 |
| JP | 2002-351592 A | 12/2002 |
| JP | 2003-536125 A | 12/2003 |
| JP | 2004-78678 A | 3/2004 |
| JP | 2012-208633 A | 10/2012 |
| JP | 2013-146095 A | 7/2013 |
| WO | 01/46790 A2 | 6/2001 |

OTHER PUBLICATIONS

Communication dated May 13, 2016, from the European Patent Office in counterpart European Application No. 15202431.1.
LG UK: "2014 LG Smart TV with webOS", Jan. 2014,(3 Pages Total), XP054976512 Retrieved from the Internet: URL:https://www.youtube.com/watch?v=_MixY8STn0l [retrieved on May 3, 2016] * Minutes 01:30-01:40 *.
XC techs: "Review Podoor PC 100 Remote & Air Mouse 2.4G Wireless Keyboard", Nov. 2013, (3 Pages Total), XP054976513 Retrieved from the Internet: URL:https://www.youtube.com/watch?v=xSVTDQyn07M [retrieved on May 3, 2016] * minutes 03:50-04:10 *.
PhoneArena: "Android TV hands-on", Jun. 2014 , (3 Pages Total), XP054976514, Retrieved from the Internet: URL:https://www.youtube.com/watch?v=-2Y_rbuH91Q [retrieved on May 3, 2016] * Minutes 01:22, 02:13 **.
Communication dated May 24, 2016, from the European Patent Office in counterpart European Application No. 15202431.1.
International Search Report and Written Opinion dated on Apr. 22, 2016, issued by International Searching Authority in corresponding International Application No. PCT/KR2015/012434. (PCT/ISA/220, PCT/ISA/210 & PCT/ISA/237).
Communication dated Feb. 14, 2017, issued by the European Patent Office in counterpart European Patent Application No. 15202431.1.
Communication dated Apr. 23, 2018, issued by the State Intellectual Property Office of P.R. China in counterpart Chinese Application No. 201511029343.1.
Communication dated Jul. 2, 2018, issued by the Japanese Patent Office in counterpart Japanese Application No. 2017-530002.
Communication dated Mar. 6, 2018, issued by the European Patent Office in counterpart European Application No. 17210787.2.
Communication dated Mar. 4, 2019, issued by the Japanese Patent Office in counterpart Japanese Application No. 2017-530002.
Communication dated Jan. 4, 2019, issued by the State Intellectual Property Office of the People's Republic of China in counterpart Chinese Patent Application No. 201511029343.1.
Communication dated Nov. 16, 2018, issued by the European Patent Office in counterpart European Patent Application No. 17210787.2.
Communication dated Jul. 2, 2019, issued by the State Intellectual Property Office of P.R. China in counterpart Chinese Application No. 201511029343.1.

* cited by examiner

FIG. 1
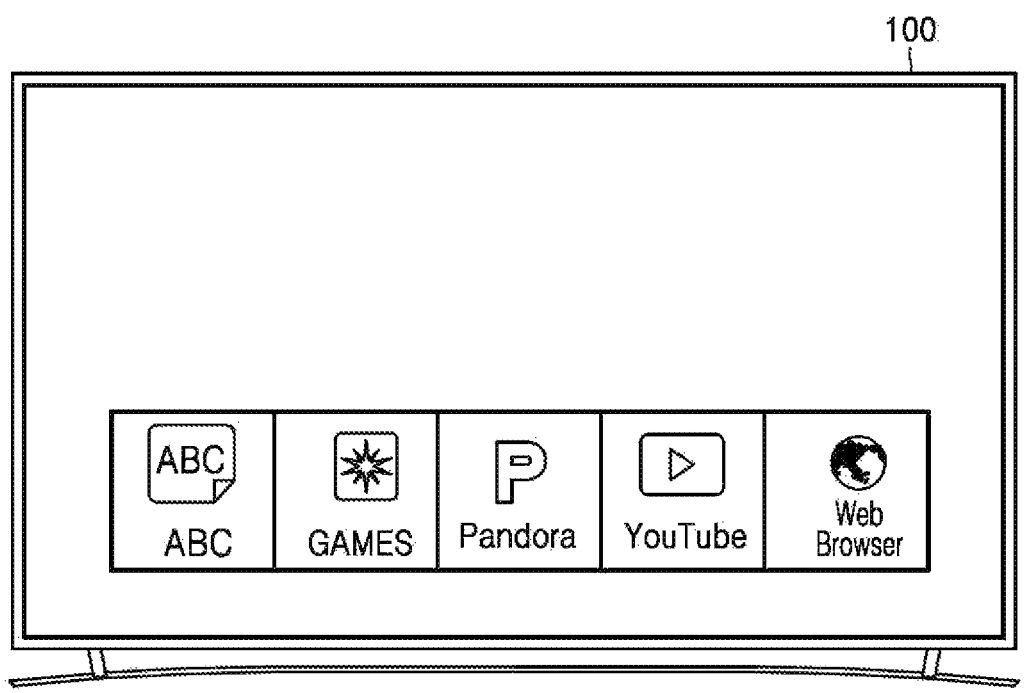
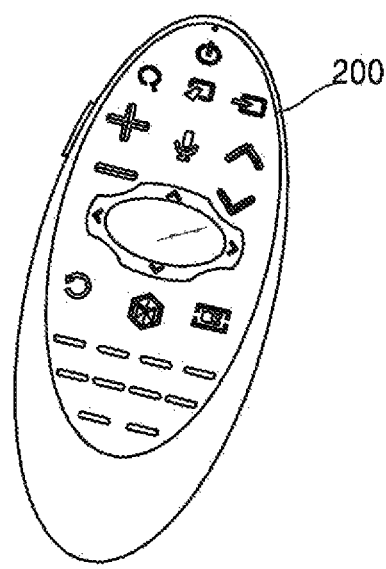

FIG. 7A
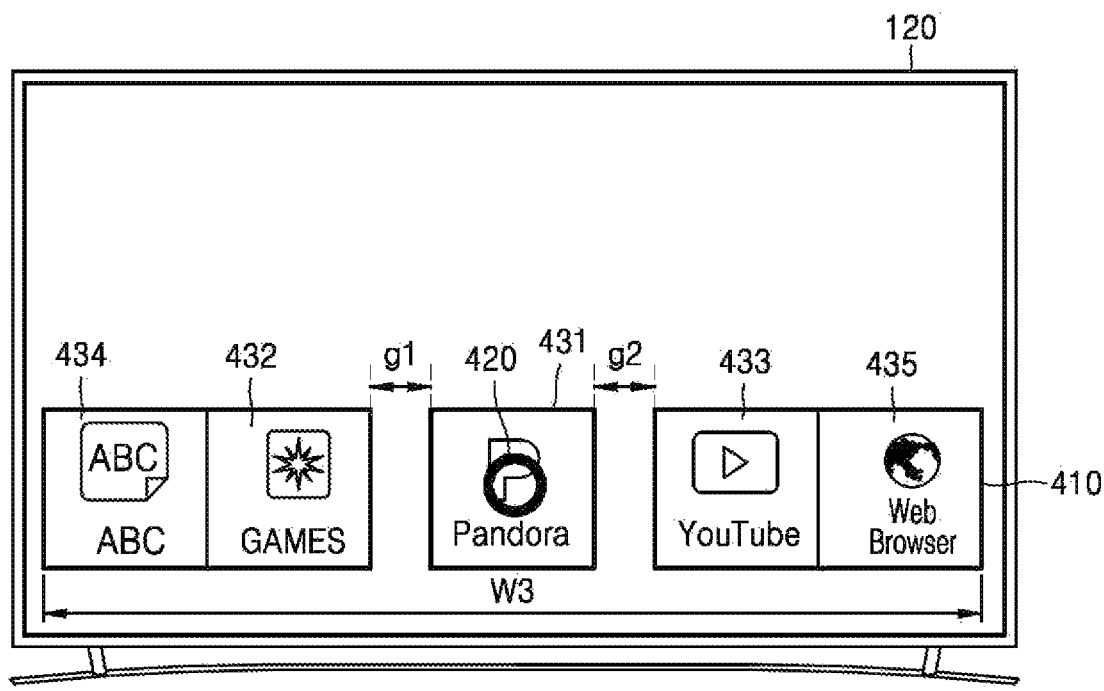
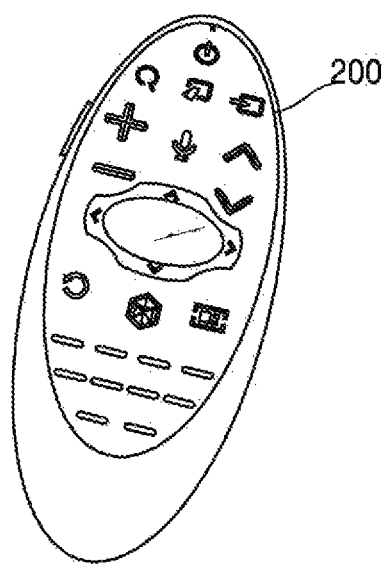

FIG. 7B
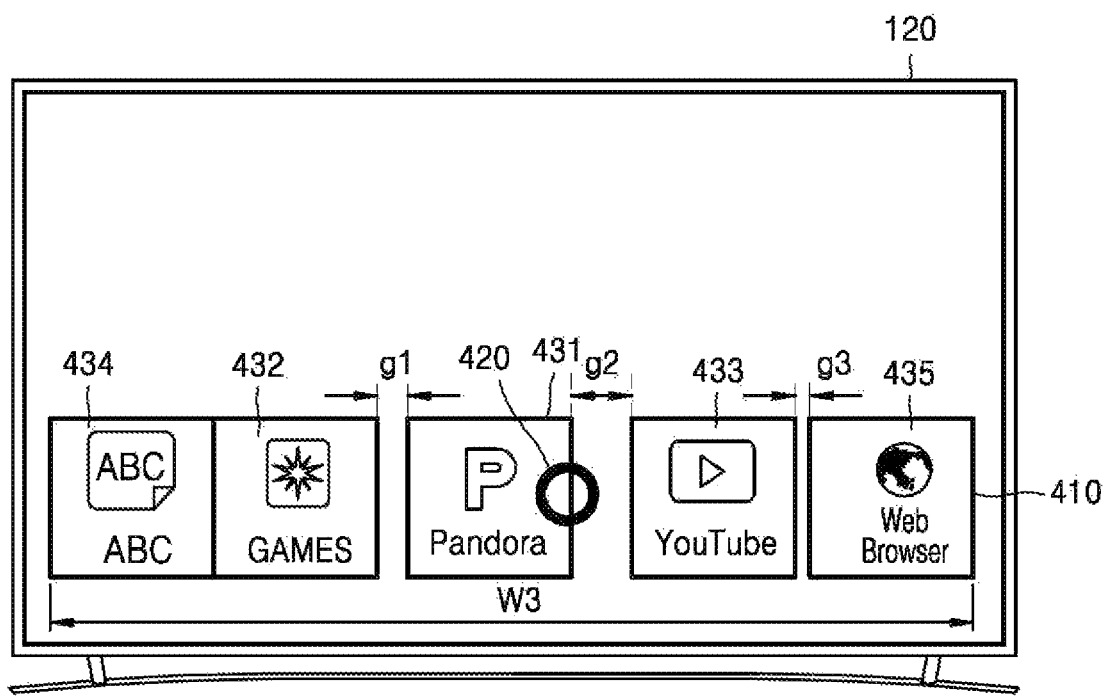
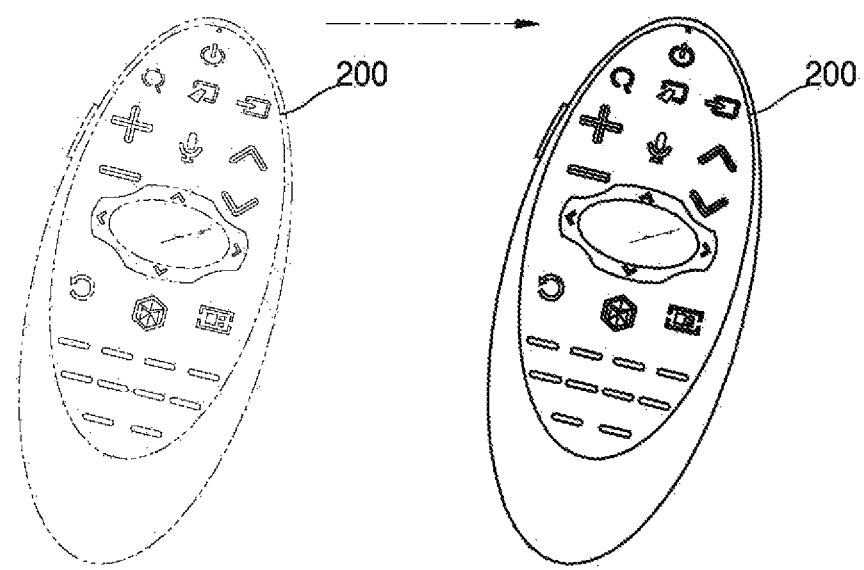

FIG. 7C
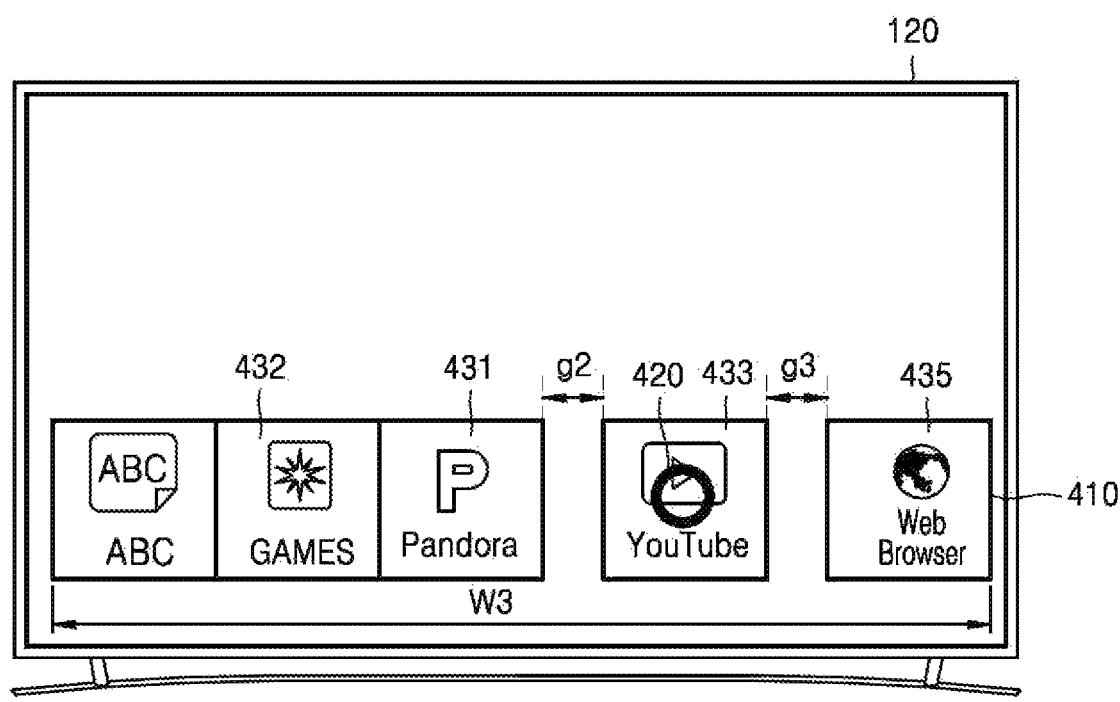
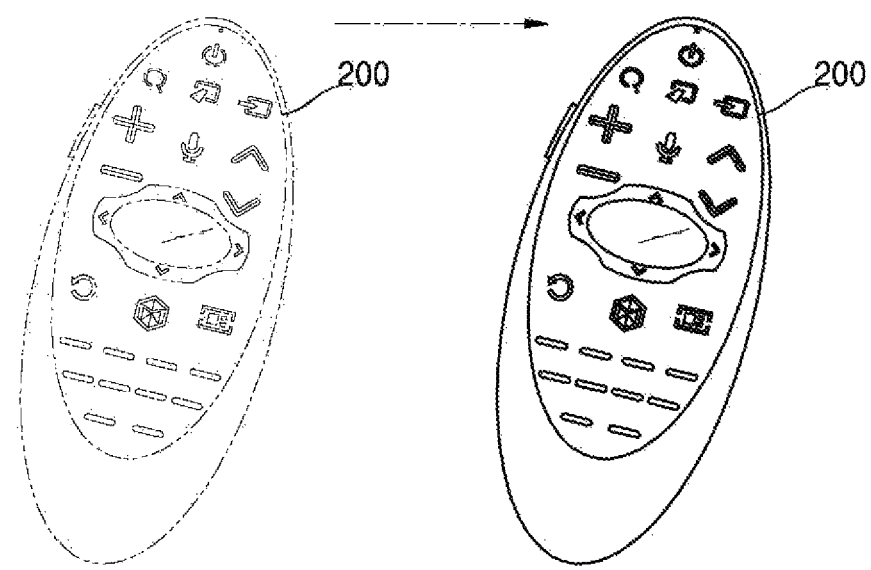

FIG. 8B
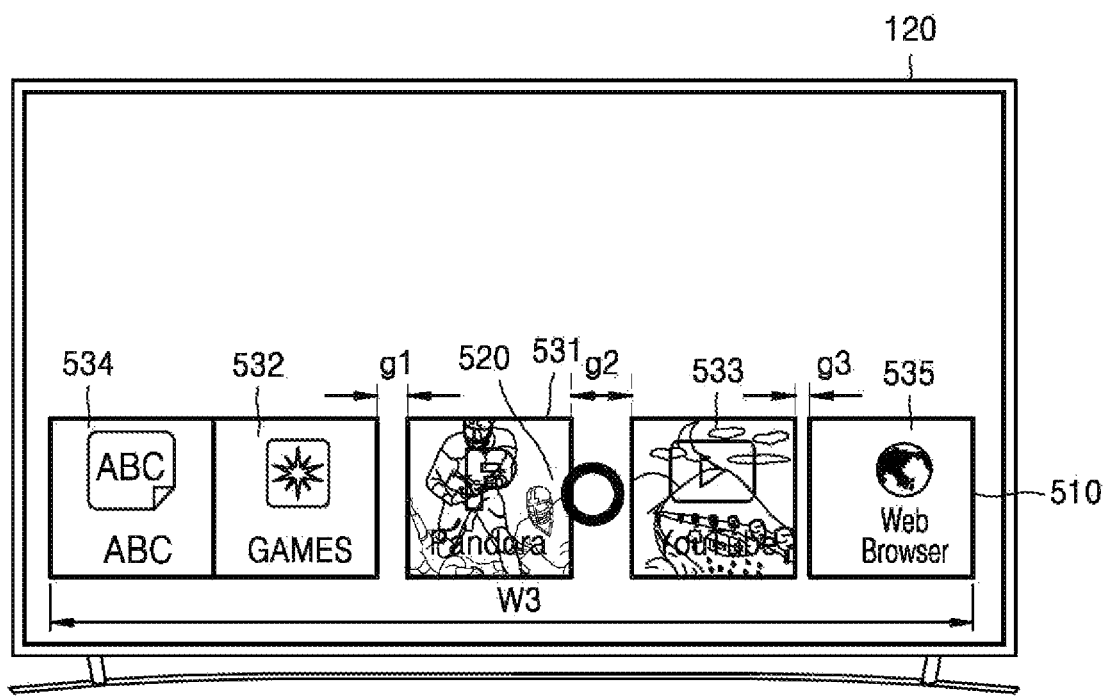
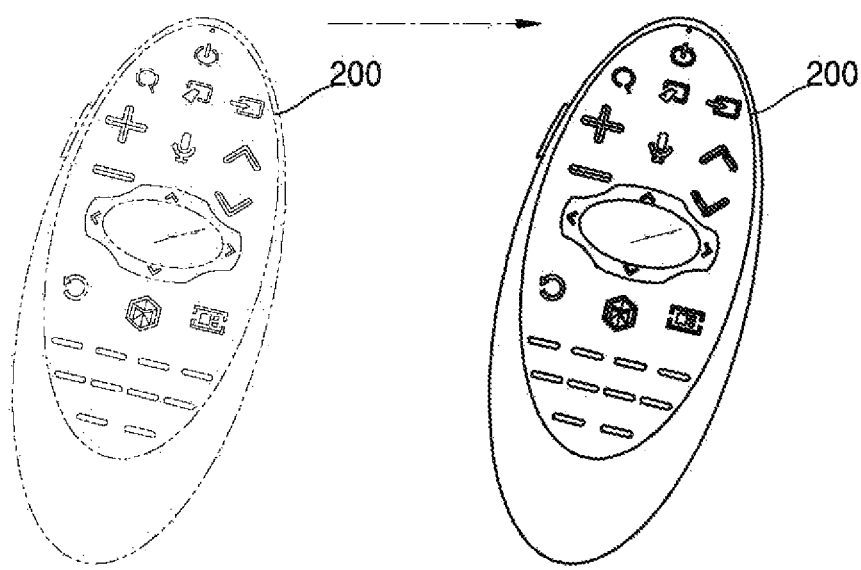

FIG. 8C
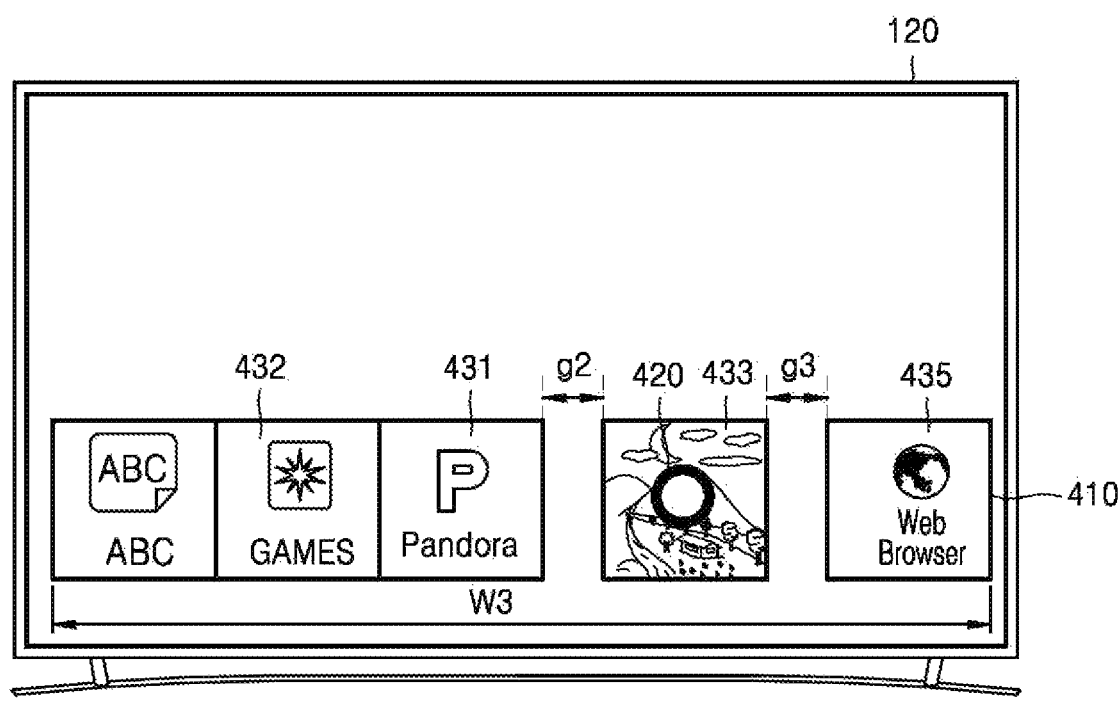
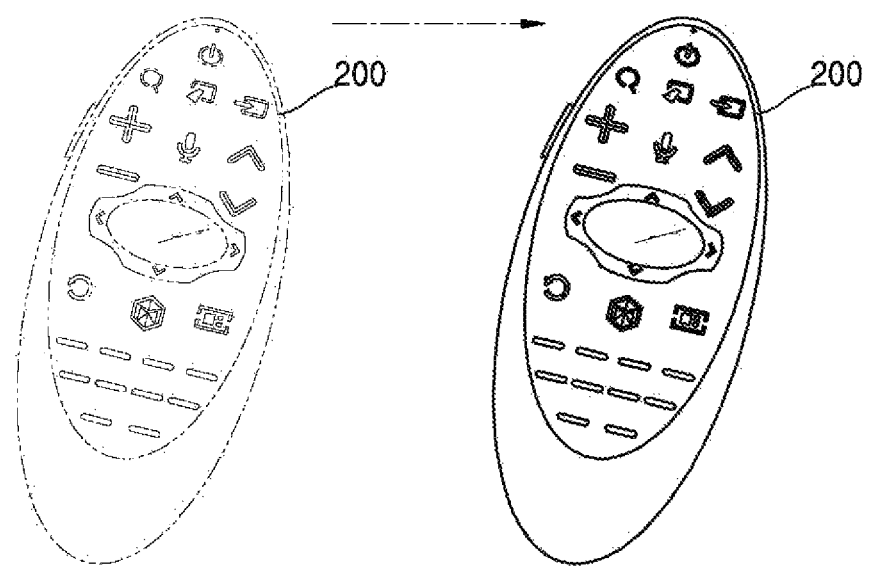

FIG. 9A
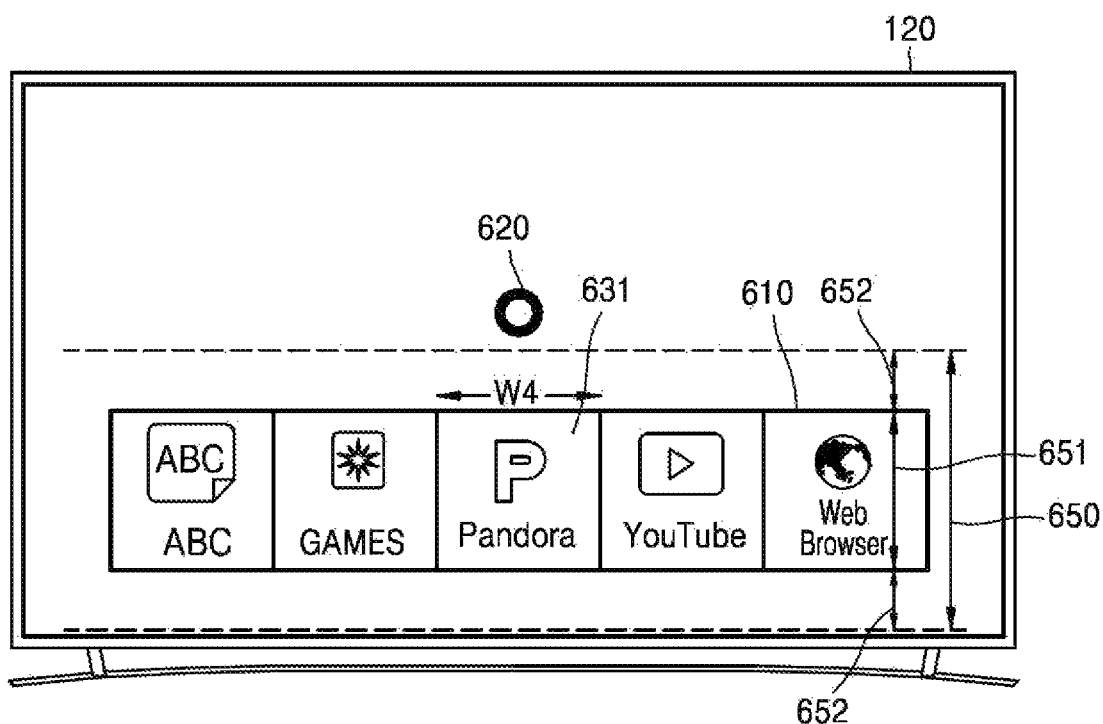
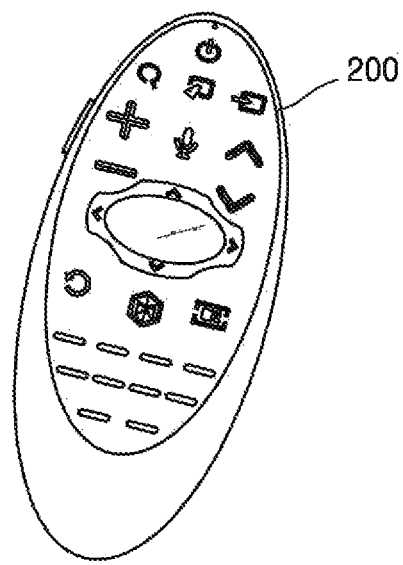

FIG. 9B
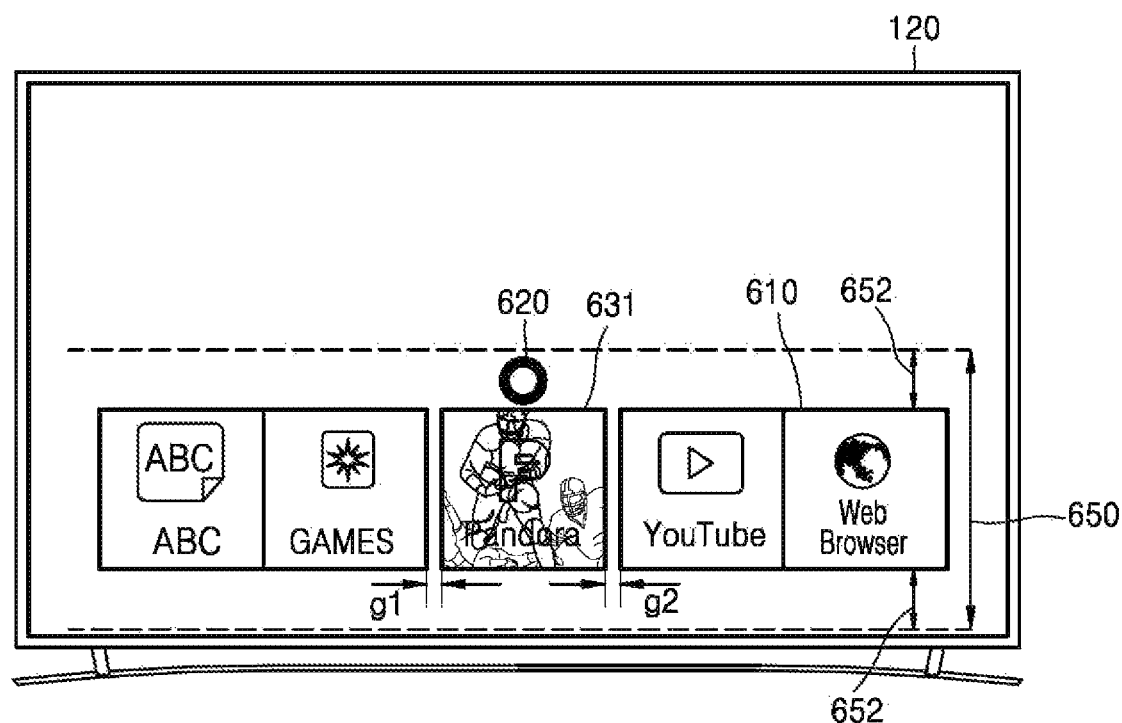
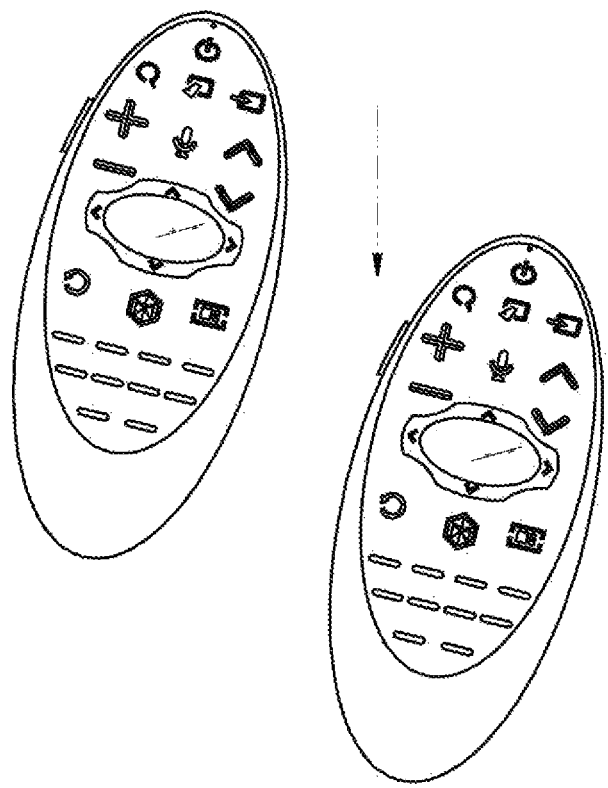

FIG. 9C
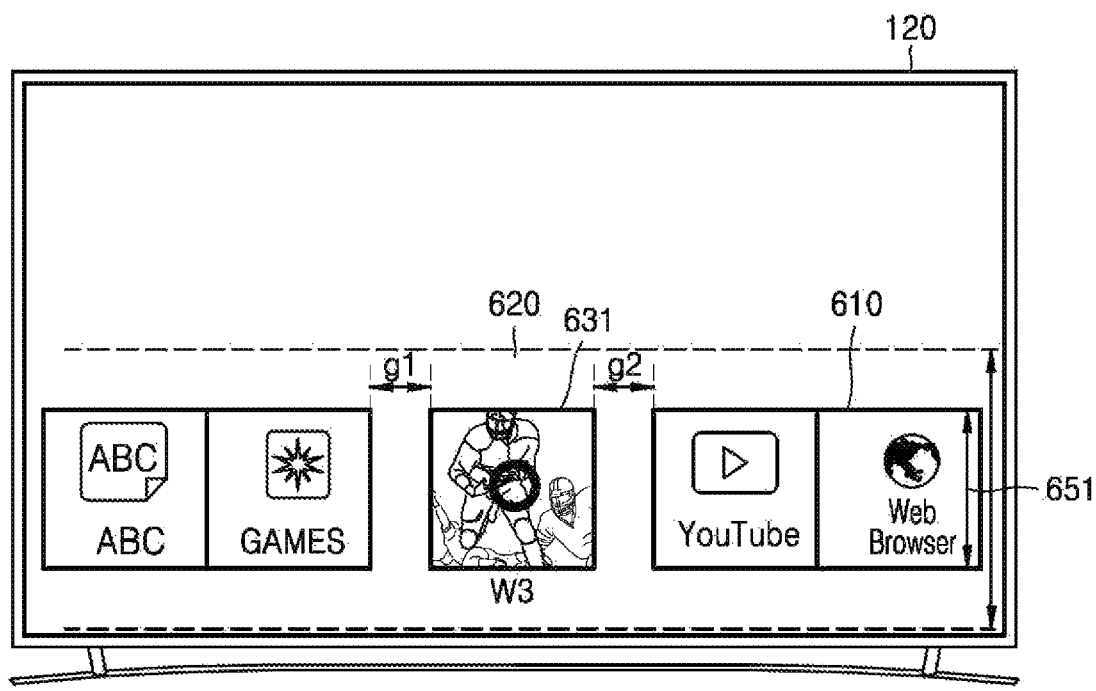
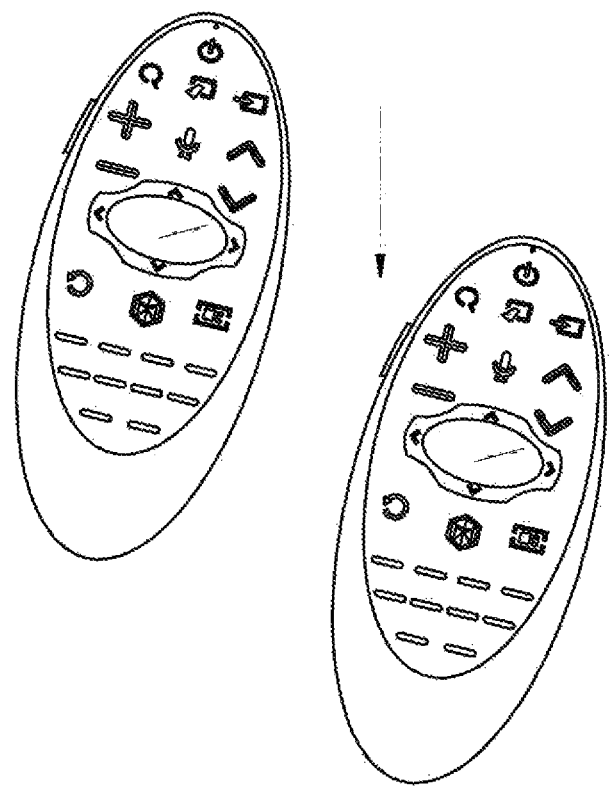

FIG. 10
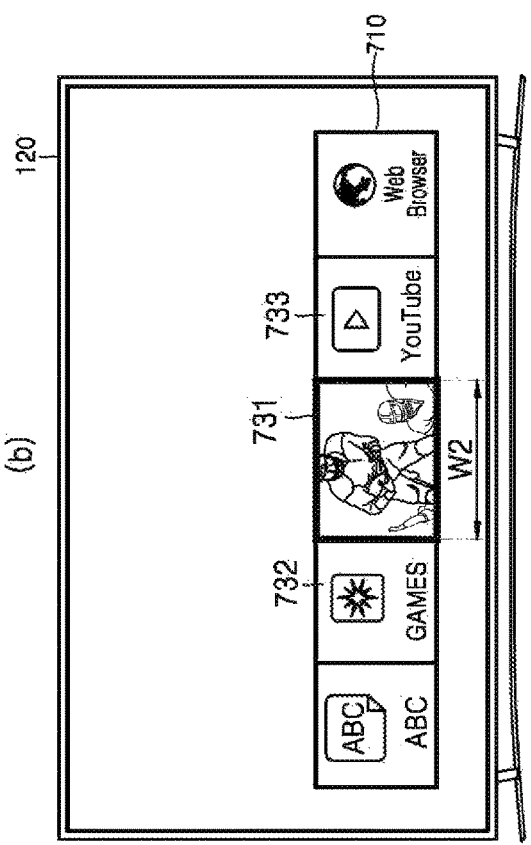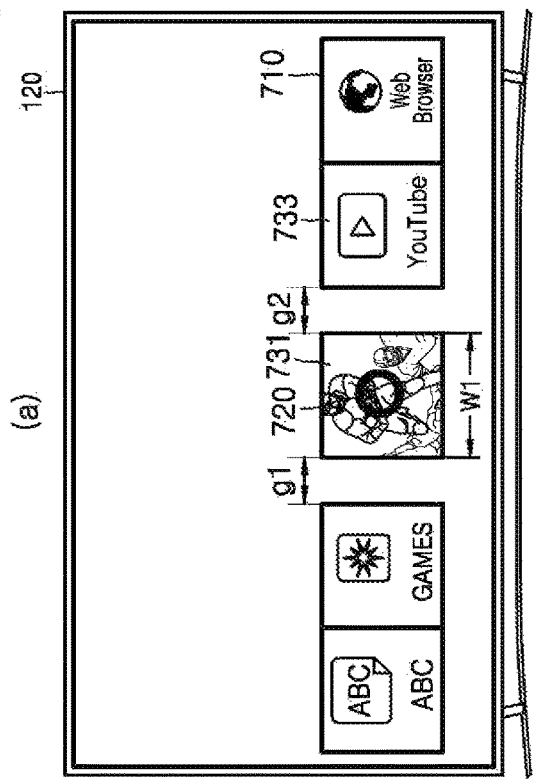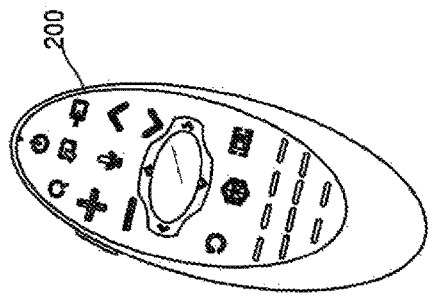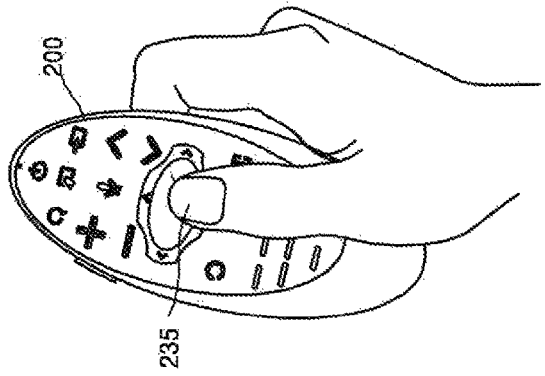

FIG. 11A
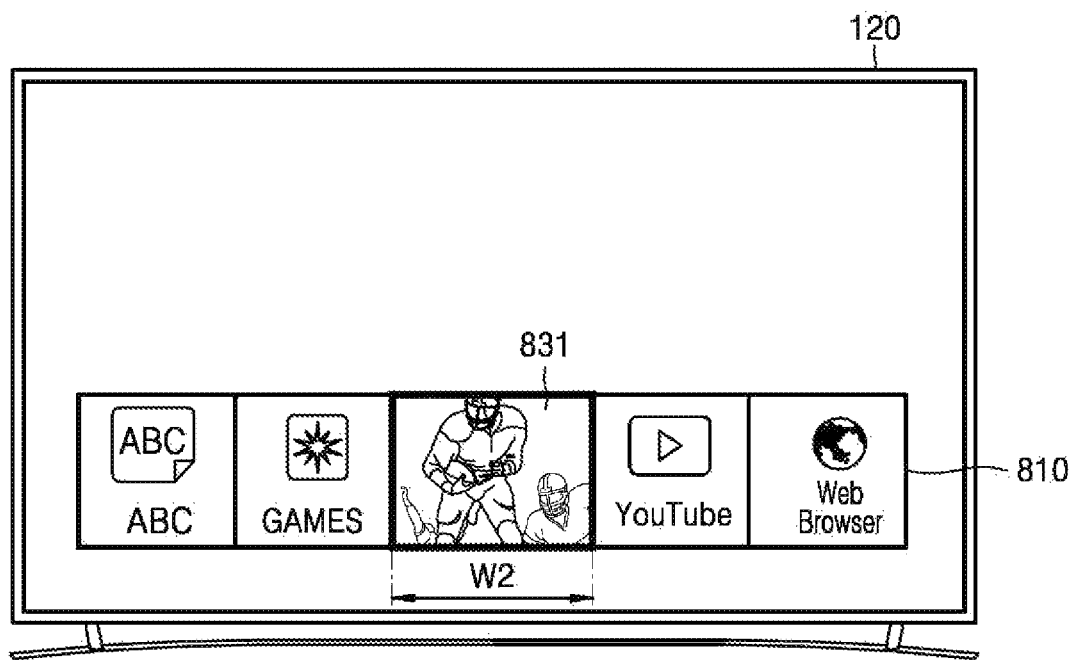
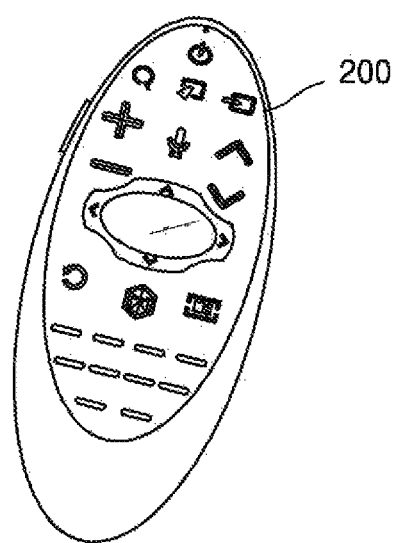

FIG. 11B
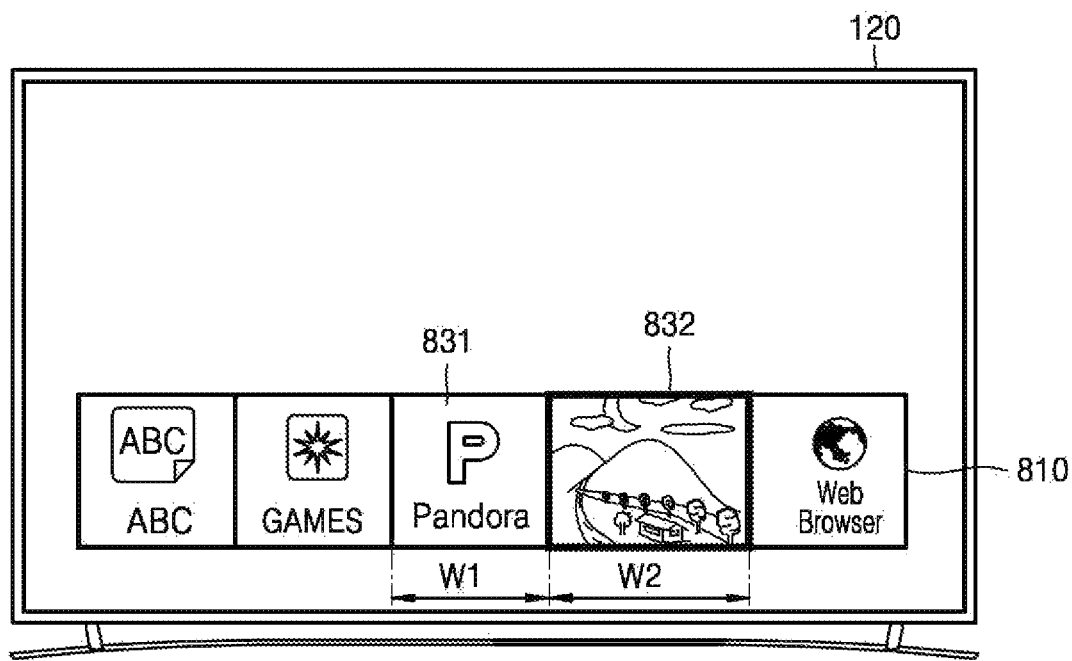
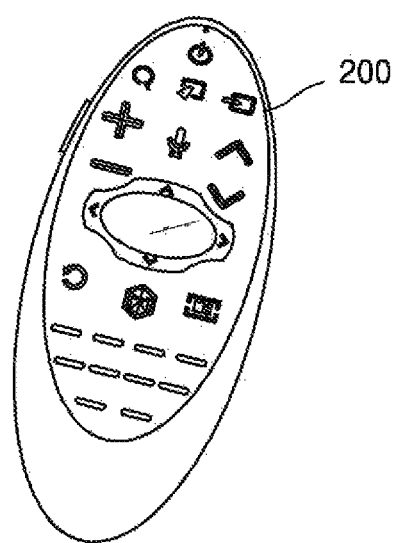

IMAGE DISPLAY APPARATUS AND METHOD OF DISPLAYING AND CHANGING ATTRIBUTES OF HIGHLIGHTED ITEMS

CROSS-REFERENCE TO RELATED APPLICATION

This application claims priority from Korean Patent Application No. 10-2015-0000867, filed on Jan. 5, 2015 in the Korean Intellectual Property Office, the disclosure of which is incorporated herein in its entirety by reference.

BACKGROUND

1. Field

Apparatuses and methods consistent with exemplary embodiments relate to an image display apparatus and an image display method, and more particularly, to an image display apparatus and an image display method, in which attributes of a highlighted item and items adjacent to the highlighted item in an item list including a plurality of items may be changed and displayed.

2. Description of the Related Art

An image display apparatus is an apparatus having a function of displaying an image that may be viewed by a user. A user may view broadcasting through an image display apparatus. An image display apparatus displays, on a display, broadcasting selected by a user from broadcast signals transmitted by a broadcasting station. Globally, broadcasting is switching from analog broadcasting to digital broadcasting.

Digital broadcasting denotes broadcasting in which digital image and audio signals are transmitted. Digital broadcasting is more robust to external noises than analog broadcasting, thereby having a low data loss, being advantageous for error correction, and providing a clear screen having high resolution. In addition, digital broadcasting enables bidirectional services, unlike analog broadcasting.

Recently, smart televisions are being provided to provide a variety of content in addition to a digital broadcasting function. Instead of being manually operated according to selection by users, smart televisions are meant to analyze and provide what users desire without manipulation from users.

SUMMARY

One or more exemplary embodiments address at least the above problems and/or disadvantages and other disadvantages not described above. Also, one or more exemplary embodiments are not required to overcome the disadvantages described above, and may not overcome any of the problems described above.

One or more exemplary embodiments provide an image display apparatus and an image display method, in which attributes of items are continuously changed and displayed according to a positional relation between a cursor and each item included in an item list.

According to an aspect of an exemplary embodiment, an image display method includes displaying an item list including items, and a cursor indicating a position of a user input for moving the cursor. The image display method further includes sensing the user input, moving the cursor based on the user input, and changing a gap between a first item and a second item adjacent to the first item, among the items, based on a positional relationship between the cursor and the first item.

The changing may include continuously changing the gap between the first item and the second item based on a distance between the first item and the cursor.

The changing may include changing the gap between the first item on which the cursor is positioned and the second item.

The changing may include changing the gap between the first item and the second item to a maximum gap in response to the cursor being positioned on a central line of the first item, and continuously decreasing the gap between the first item and the second item as the cursor is moved from the central line.

The changing may include changing a first gap between the first item and the second item to a maximum gap, and changing a second gap between the first item and a third item adjacent to the first item, among the items, to the maximum gap, in response to the cursor being positioned on a central line of the first item. The changing may further include continuously decreasing the first gap, and maintaining the second gap, as the cursor is moved from the central line of the first item to a central line of the third item. The changing may further include changing the first gap to a minimum gap in response to the cursor being positioned on the central line of the third item.

The changing may include setting a third gap between the third item and a fourth item adjacent to the third item, among the items, to the minimum gap in response to the cursor being positioned on the central line of the first item. The changing may further include continuously increasing the third gap as the cursor is moved from the central line of the first item to the central line of the third item, and changing the third gap to the maximum gap in response to the cursor being positioned on the central line of the third item.

The image display method may further include changing opacity of an image of the first item based on the positional relationship between the cursor and the first item.

The changing the opacity may include changing opacity of a first image of the first item to a maximum value in response to the cursor being positioned on a central line of the first item, and continuously decreasing the opacity of the first image as the cursor is moved from the central line.

The changing the opacity may include changing opacity of a second image of the first item to a minimum value in response to the cursor being positioned on the central line, and continuously increasing the opacity of the second image as the cursor is moved from the central line.

The changing the opacity may include changing opacity of a first image of the first item to a maximum value, and changing opacity of a second image of the first item to a minimum value, in response to the cursor being positioned on a central line of the first item. The changing the opacity may further include continuously decreasing the opacity of the first image, and continuously increasing the opacity of the second image, as the cursor is moved from the central line of the first item to a central line of the second item. The changing the opacity may further include changing the opacity of the first image to the minimum value, and changing the opacity of the second image to the maximum value, in response to the cursor being positioned on the central line of the second item.

The changing the opacity may include changing opacity of a third image of the second item to the minimum value, and changing opacity of a fourth image of the second item to the maximum value, in response to the cursor being positioned on the central line of the first item. The changing the opacity may further include continuously increasing the opacity of the third image, and continuously decreasing the opacity of the fourth image, as the cursor is moved from the central line of the first item to the central line of the second item. The changing the opacity may further include changing the opacity of the third image to the maximum value, and changing the opacity of the fourth image to the minimum value, in response to the cursor being positioned on the central line of the second item.

The image display method may further include sensing an input for entering a pointing mode, and displaying the cursor based on the input.

The image display method may further include sensing an infrared (IR) signal, preventing the display of the cursor, highlighting the first item, and changing an attribute of the first item from a first value to a second value, based on the IR signal, sensing another user input for moving the highlight, and highlighting the second item, changing an attribute of the second item from the first value to the second value, and changing the attribute of the first item from the second value back to the first value, based on a direction of the other user input.

According to an aspect of an exemplary embodiment, an image display apparatus includes a display configured to display an item list including items, and a cursor indicating a position of a user input for moving the cursor. The image display apparatus further includes a sensor configured to sense the user input, and a controller configured to control the display to move the cursor based on the user input, and change a gap between a first item and a second item adjacent to the first item, among the items, based on a positional relationship between the cursor and the first item.

The controller may be further configured to control the display to continuously change the gap between the first item and the second item based on a distance between the first item and the cursor.

The controller may be further configured to control the display to change the gap between the first item on which the cursor is positioned and the second item.

The controller may be further configured to control the display to change the gap between the first item and the second item to a maximum gap in response to the cursor being positioned on a central line of the first item, and continuously decrease the gap between the first item and the second item as the cursor is moved from the central line.

The controller may be further configured to control the display to change a first gap between the first item and the second item to a maximum gap, and change a second gap between the first item and a third item adjacent to the first item, among the items, to the maximum gap, in response to the cursor being positioned on a central line of the first item, continuously decrease the first gap, and maintain the second gap, as the cursor is moved from the central line of the first item to a central line of the third item, and change the first gap to a minimum gap in response to the cursor being positioned on the central line of the third item.

The controller may be further configured to control the display to set a third gap between the third item and a fourth item adjacent to the third item, among the items, to the minimum gap in response to the cursor being positioned on the central line of the first item, continuously increase the third gap as the cursor is moved from the central line of the first item to the central line of the third item, and change the third gap to the maximum gap in response to the cursor being positioned on the central line of the third item.

The controller may be further configured to control the display to change opacity of an image of the first item based on the positional relationship between the cursor and the first item.

The controller may be further configured to control the display to change opacity of a first image of the first item to a maximum value in response to the cursor being positioned on a central line of the first item, and continuously decrease the opacity of the first image as the cursor is moved from the central line.

The controller may be further configured to control the display to change opacity of a second image of the first item to a minimum value in response to the cursor being positioned on the central line, and continuously increase the opacity of the second image as the cursor is moved from the central line.

The controller may be further configured to control the display to change opacity of a first image of the first item to a maximum value, and change opacity of a second image of the first item to a minimum value, in response to the cursor being positioned on a central line of the first item, continuously decrease the opacity of the first image, and continuously increase the opacity of the second image, as the cursor is moved from the central line of the first item to a central line of the second item, and change the opacity of the first image to the minimum value, and change the opacity of the second image to the maximum value, in response to the cursor being positioned on the central line of the second item.

The controller may be further configured to control the display to change opacity of a third image of the second item to the minimum value, and change opacity of a fourth image of the second item to the maximum value, in response to the cursor being positioned on the central line of the first item, continuously increase the opacity of the third image, and continuously decrease the opacity of the fourth image, as the cursor is moved from the central line of the first item to the central line of the second item, and change the opacity of the third image to the maximum value, and change the opacity of the fourth image to the minimum value, in response to the cursor being positioned on the central line of the second item.

The sensor may be further configured to sense an input for entering a pointing mode, and the controller may be further configured to control the display to display the cursor based on the input.

The sensor may be further configured to sense an infrared (IR) signal, the controller may be further configured to control the display to prevent the display of the cursor, highlight the first item, and change an attribute of the first item from a first value to a second value, based on the IR signal, the sensor may be further configured to sense another user input for moving the highlight, and the controller may be further configured to control the display to highlight the second item, change an attribute of the second item from the first value to the second value, and change the attribute of the first item from the second value back to the first value, based on a direction of the other user input.

According to an aspect of an exemplary embodiment, an image display apparatus includes a display configured to display an item list including items, and a cursor indicating a position of a user input for moving the cursor, a sensor configured to sense the user input, and a controller configured to control the display to move the cursor based on the user input, and change opacity of an image of an item among the items based on the positional relationship between the cursor and the item.

The controller may be further configured to control the display to change the opacity of the image to a maximum value in response to the cursor being positioned on a central line of the item, and continuously decrease the opacity of the image as the cursor is moved from the central line.

BRIEF DESCRIPTION OF THE DRAWINGS

The above and/or other aspects will be more apparent by describing exemplary embodiments, with reference to the accompanying drawings, in which:

FIG. 1 is a diagram showing an image display apparatus and a control apparatus, according to an exemplary embodiment;

FIGS. 7A, 7B, and 7C are diagrams showing a gap between a highlighted item and an item adjacent to the highlighted item being changed with movement of a cursor, according to an exemplary embodiment;

FIGS. 8A, 8B, and 8C are diagrams showing opacity of an image displayed in a highlighted item and an item adjacent to the highlighted item being changed with movement of a cursor, according to an exemplary embodiment;

FIGS. 9A, 9B, and 9C are diagrams showing an attribute of an item being changed when a cursor is moved from a region in which an item list is not displayed to a region in which the item list is displayed, according to an exemplary embodiment;

FIG. 10 is a diagram showing an attribute of an item being changed when a pointing mode is switched to a four-direction mode, according to an exemplary embodiment;

FIGS. 11A and 11B are diagrams showing an image display apparatus operating in a four-direction mode, according to an exemplary embodiment.

DETAILED DESCRIPTION

Figure 2:
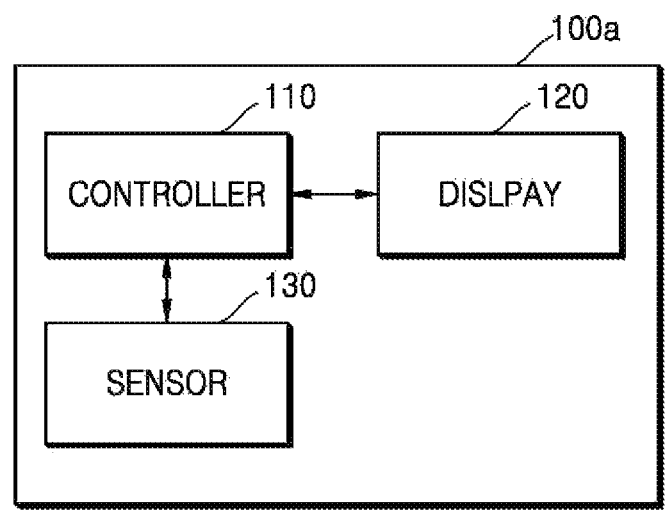
FIG. 2 is a block diagram showing a configuration of an image display apparatus, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit", "-er (-or)", and "module" described in the specification refer to an element for performing at least one function or operation, and may be implemented in hardware, software, or the combination of hardware and software.

FIG. 1 is a diagram showing an image display apparatus 100 and a control apparatus 200, according to an exemplary embodiment.

As shown in FIG. 1, the images display apparatus 100 may be a TV, which is an example, and may be implemented as an electronic device including a display 120 of FIG. 2. For example, the image display apparatus 100 may be implemented as one of various electronic devices such as a smart phone, a tablet PC, a digital camera, a camcorder, a laptop computer, a desk top, an e-book terminal, a digital broadcasting terminal, a personal digital assistant (PDA), a portable multimedia player (PMP), a navigation device, an MP3 player, a wearable device, etc. Exemplary embodiments may be easily implemented in a display device having a large display 120 such as a TV, but are not limited thereto. In addition, the image display apparatus 100 may be stationary or mobile and may be a digital broadcasting receiver capable of receiving digital broadcasting.

The image display apparatus 100 may be implemented as a curved display apparatus that is a screen with a curvature and a flexible display apparatus having an adjustable curvature, in addition to a flat display apparatus. An output resolution of the image display apparatus 100 may include, for example, a high definition (HD), full HD, ultra HD, or higher resolution.

The control apparatus 200 may be implemented as various types of apparatuses for controlling the image display apparatus 100 such as a remote controller or cell phone.

In addition, the control apparatus 200 may control the image display apparatus 100 through short range communication such as infrared (IR) or Bluetooth. The control apparatus 200 may control a function of the image display apparatus 100 using at least one of a key (including a button), a touchpad, a microphone capable of receiving a user's voice, and a sensor capable of recognizing a motion of the control apparatus 200.

The control apparatus 200 includes a power on/off button for powering the image display apparatus 100 on or off. The control apparatus 200 may also change a channel on, adjust volume of, select a terrestrial broadcast/cable broadcast/satellite broadcast on, or set a configuration of the image display apparatus 100 according to a user input.

In addition, the control apparatus 200 may be a pointing device. For example, the control apparatus 200 may operate as a pointing device when a predetermined key input is received.

The image display apparatus 100 may be controlled by a user input of moving the control apparatus 200 up, down, left, or right or tilting the control apparatus 200 in any direction. Information regarding movement of the control apparatus 200 that is sensed through a sensor of the control apparatus 200 may be transmitted to the image display apparatus 100. The image display apparatus 100 may calculate coordinates of the cursor on the display from the information regarding the movement of the control apparatus 200 and move the cursor in accordance with the calculated coordinates. Thus, the cursor may be moved on the display of the image display apparatus 100, or various displayed menus may be activated.

Alternatively, on a condition that the control apparatus 200 includes a touch pad, the cursor may be moved on the display of the image display apparatus 100, or various displayed menus are selectively activated according to a displacement of a subject such as a user's finger that moves on the touch pad.

The term "user" used herein denotes a person who uses the control apparatus 200 to control a function or operation of the image display apparatus 100 and may include a viewer, a manager, or an installation engineer.

According to an exemplary embodiment, the image display apparatus 100 may display an item list including a plurality of items and a cursor indicating a position of a user input on the display.

In addition, in response to an input of the control apparatus 200, the image display apparatus 100 according to an exemplary embodiment moves the cursor and continuously changes an attribute of at least one item among a plurality of items according to a positional relationship between the cursor and the item.

FIG. 2 is a block diagram showing a configuration of an image display apparatus 100*a* according to an exemplary embodiment. The image display apparatus 100*a* of FIG. 2 may be an example of the image display apparatus 100 of FIG. 1.

Referring to FIG. 2, the image display apparatus 100*a* according to an exemplary embodiment includes a controller 110, a display 120, and a sensor 130.

The display 120 converts an image signal, a data signal, an on-screen display (OSD) signal, a control signal or the like, which is processed by the controller 110, into a driving signal. The display 120 may be implemented as a plasma display panel (PDP), a liquid crystal display (LCD), an organic light emitting diode (OLED), or a flexible display and may also be implemented as a three-dimensional (3D) display. In addition, the display 120 may be configured as a touch screen and thus used as an input device as well as an output device.

The display 120 according to an exemplary embodiment may display an item list including a plurality of items. In addition, the display 120 may display a cursor indicating a position of a user input on the display 120.

The sensor 130 according to an exemplary embodiment may sense the user input and deliver the sensed signal to the controller 110. In addition, the sensor 130 may sense a user input, such as a power on/off, a channel selection, a channel up/down, or a screen setting, from the control apparatus 200. The sensor 130 according to an exemplary embodiment may sense a user input for moving the cursor displayed on the display 120. In addition, the sensor 130 according to an exemplary embodiment may sense an input for entering a pointing mode. For example, the sensor 130 may sense an input of touching a touch region or an input of pressing a predetermined button of the user input interface of the control apparatus 200.

The controller 110 according to an exemplary embodiment may process an image signal and input the processed image signal to the display 120. Thus, an image to the image signal may be displayed on the display 120. In addition, the controller 110 may control the image display apparatus 100*a* by a user command sensed through the sensor 130 or an internal program.

For example, according to an exemplary embodiment, the controller 110 may move the cursor displayed on the display 120 in accordance with the sensed user input. In addition, the controller 110 may change a gap between items on the basis of a positional relationship between the cursor and each item according to an exemplary embodiment.

The controller 110 may continuously change a gap between one item and an item adjacent to the item according to a distance between the item and the cursor.

When the cursor is positioned on a central line of the item, the controller 110 changes the gap between the item and the adjacent item to a maximum gap. As the cursor is moved far from the central line of the item, the controller 110 may continuously decrease the gap between the item and the adjacent item.

When the cursor is positioned on a central line of a first item, the controller 110 may change a first gap between the first item and a second item adjacent to the first item and a second gap between the first item and a third item adjacent to the first item to a maximum gap. As the cursor is moved from the central line of the first item to a central line of the second item, the controller 110 may continuously decrease the second gap while maintaining the first gap. When the cursor is positioned on the central line of the second item, the controller 110 may change the second gap to a minimum gap.

When the cursor is positioned on the central line of the first item, the controller 110 may change a third gap between the second item and a fourth item adjacent to the second item. As the cursor is moved from the central line of the first item to a central line of the second item, the controller 110 may continuously increase the third gap. When the cursor is positioned on the central line of the second item, the controller 110 may change the third gap to a maximum gap.

The controller 110 may change opacity of an image of the item on the basis of a positional relationship between the item and the cursor. When the cursor is positioned on a central line of the item, the controller 110 may change opacity of a first image of the item to a maximum value. As the cursor is moved far from the central line, the controller 110 may continuously decrease the opacity of the first image.

When the cursor is positioned on a central line of the item, the controller 110 may change opacity of a second image of the item to a minimum value. As the cursor is moved far from the central line, the controller 110 may continuously increase the opacity of the second image.

When the cursor is positioned on a central line of the first item among the plurality of items, the controller 110 may change the opacity of the first image of the first item to a maximum value and may change the opacity of the second image of the first item to a minimum value. As the cursor is moved from the central line of the first item to the central line of the second item adjacent to the first item, the controller 110 may continuously decrease the opacity of the first image and continuously increase the opacity of the second image. When the cursor is positioned on the central line of the second item, the controller 110 may change the opacity of the first image to a minimum value and may change the opacity of the second image to a maximum value.

When the cursor is positioned on the central line of the first item, the controller 110 may change opacity of a third image of the second item adjacent to the first item and may change opacity of a fourth image of the second item to a maximum value. As the cursor is moved from the central line of the first item to the central line of the second item, the controller 110 may increase the opacity of the third image and decrease the opacity of the fourth image. When the cursor is positioned on the central line of the second item, the controller 110 may change the opacity of the third image to a maximum value and may change the opacity of the fourth image to a minimum value.

When an input for entering a pointing mode is sensed, the controller 110 may display the cursor on the display 120 in response to the input.

When an IR signal is sensed during the pointing mode, the controller 110 does not display the cursor, and may highlight the first item among the plurality of items and change an attribute value from a first value to a second value.

In addition, when a user input for moving the highlight, the controller 110 may highlight the second item adjacent to the first item, change an attribute value of the second item from the first value to the second value, and change the attribute value from the second value back to the first value.

Figure 3:
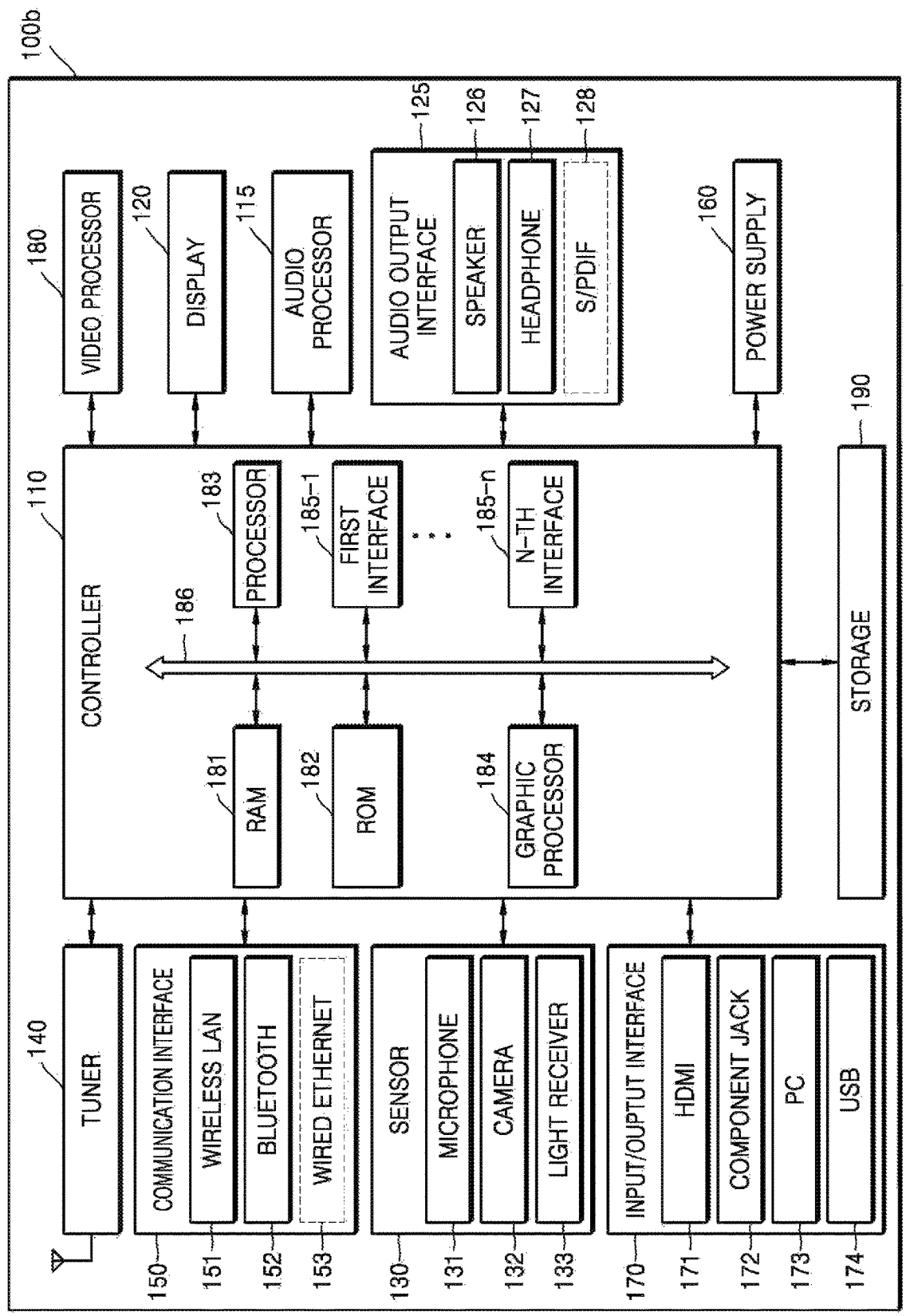
FIG. 3 is a block diagram showing a configuration of an image display apparatus, according to an exemplary embodiment.

FIG. 3 is a block diagram showing a configuration of an image display apparatus 100b, according to an exemplary embodiment. The image display apparatus 100b of FIG. 3 may be an example of the image display apparatus 100 of FIG. 1.

Referring to FIG. 3, the image display apparatus 100b according to an exemplary embodiment further includes a video processor 180, an audio processor 115, an audio output interface 125, a power supply 160, a tuner 140, a communication interface 150, an input/output interface 170, and a storage 190 in addition to the controller 110, the display 120, and the sensor 130.

In description of FIG. 3, repetitive description on the controller 110, the display 120, and the sensor 130 described in FIG. 2 will be omitted.

The video processor 180 processes video data received by the image display apparatus 100b. The video processor 180 may perform various image processing operations, such as decoding, scaling, noise filtering, frame rate conversion, and resolution conversion, on the video data.

The display 120 displays a video included in a broadcast signal received through the tuner 140 by control of the controller 110. In addition, the display 120 may display content that is input through the communication interface 150 or the input/output interface 170. The display 120 may output an image stored in the storage 190 by control of the controller 110. In addition, the display 120 may display a voice user interface (UI) (e.g., including a voice command guide) for performing a voice recognition task corresponding to voice recognition or a motion UI (e.g., including a user motion guide for motion recognition) for performing a motion recognition task corresponding to motion recognition.

The audio processor 115 processes audio data. The audio processor 115 may perform various processing operations, such as decoding, amplification, and noise filtering, on the audio data. The audio processor 115 may include a plurality of audio processing modules to process audios corresponding to a plurality of pieces of content.

The audio output interface 125 outputs an audio included in a broadcast signal received through the tuner 140 by control of the controller 110. The audio output interface 125 may output an audio (e.g., a voice or sound) that is input through the communication interface 150 or the input/output interface 170. In addition, the audio output interface 125 may output an audio stored in the storage 190 by control of the controller 110. The audio output interface 125 may include at least one of a speaker 126, a headphone output terminal 127, and a Sony/Philips digital interface (S/PDIF) output terminal 128. The audio output interface 125 may include a combination of the speaker 126, the headphone output terminal 127, and the S/PDIF output terminal 128.

The power supply 130 supplies power that is input from an external power source to elements inside the image display apparatus 100b by control of the controller 110. In addition, the power supply 130 may supply the internal elements with power that is output from one or more batteries positioned inside the image display apparatus 100b by control of the controller 110.

The tuner 140 may conduct amplification, mixing, or resonance on a broadcast signal received by cable or wirelessly to tune and select only a frequency of a channel to be received by the display apparatus 100 among many radio wave components. The broadcast signal includes an audio, a video, and addition information (e.g., electronic program guide (EPG)).

The tuner 140 may receive a broadcast signal in a frequency band corresponding to a channel number (e.g., cable broadcasting No. 506) in response to a user input (e.g., a control signal including a channel number input, a channel up/down input, and a channel input on an EPG screen, which is received from the control apparatus 200).

The tuner 140 may receive a broadcast signal from various sources, such as terrestrial broadcasting, cable broadcasting, satellite broadcasting, and Internet broadcasting. The tuner 140 may also receive a broadcast signal from a source such as an analog broadcasting or digital broadcasting source. The broadcast signal received through the tuner 140 may be decoded (e.g., audio-decoded, video-decoded, or additional-information-decoded) into an audio, a video, and/or additional information. The decoded audio, video, and/or additional information may be stored in the storage 190 by control of the controller 110.

The number of tuners 140 of the image display apparatus 100b may be one or more. The tuner 140 may be implemented in one body with the image display apparatus 100b or may implemented as a separate device (e.g., a set-top box, a tuner connected to the input/output interface 170, etc.) having a tuner, which is electrically connected with the image display apparatus 100b.

The communication interface 150 may connect the image display apparatus 100b with an external device (e.g., an audio device) by control of the controller 110. The controller may transmit/receive content to/from an external device connected through the communication interface 150 and may download, or perform web browsing on, an application from the external apparatus. The communication interface 150 may include one of a wireless LAN (WLAN) 151, Bluetooth 152, and wired Ethernet 153 in accordance with the performance and the structure of the display apparatus 100. In addition, the communication interface 150 may include a combination of the WLAN 151, Bluetooth 152, and wired Ethernet 153. The communication interface 150 may receive a control signal of the control apparatus 200 by control of the controller 110. The control signal may be implemented as a Bluetooth type signal, RF type signal, or WiFi type signal.

For example, the communication interface 150 may receive a signal corresponding to a Bluetooth type user input (e.g., a touch, press, touch gesture, voice, or motion) from the control apparatus 200 through communication using Bluetooth 152. The communication interface 150 may further include short range communication (e.g., near field communication (NFC) and Bluetooth low energy (BLE) in addition to Bluetooth.

The sensor 130 senses a user's voice, image, or interaction.

A microphone 131 receives a voice uttered by a user. The microphone 313 may convert the received voice into an electrical signal and output the electrical signal to the controller 110. The user's voice may include, for example, a voice corresponding to a menu or function of the image display apparatus 100b. A recognition range of the microphone 131 may be recommended as a distance of 4 meters or less from the microphone 131 to the user's position and may vary depending on a level of the user's voice and surrounding environments (e.g., a speaker sound or ambient noise).

According to an exemplary embodiment, the microphone 131 may receive the voice uttered by the user and output the received voice data to the controller 110 such that the controller 110 may use the voice data to identify an identity of the user who watches the image display apparatus 100b.

The microphone 131 may be implemented in one body with or separately from the image display apparatus 100b. The separate microphone 131 may be electrically connected with the image display apparatus 100b through the communication interface 150 or input/output interface 170.

It will be readily understood by those skilled in the art that the microphone 131 may be excluded according to the performance and the structure of the image display apparatus 100b.

A camera 132 receives an image (e.g., consecutive frames) corresponding to the user's motion including a gesture in a camera recognition range. For example, the recognition range of the camera 132 may be a distance of about 0.1 meters to about 5 meters from the camera to the user. For example, the user's motion may include a body part of a user, such as the face, hand, fist, or finger of the user, or a motion of the body part of the user. The camera 132 may convert the received image into an electrical signal and output the electrical signal to the controller 110 by control of the controller 110.

According to an exemplary embodiment, the camera 132 may capture the face of the user and output the captured face image to the controller 110 such that the controller 110 may use the face image to identify an identity of the user who watches the image display apparatus 100b.

The controller 110 may use the received motion recognition result to select a menu displayed on the image display apparatus 100b or perform control corresponding to the motion recognition result. For example, the control may include channel adjustment, volume adjustment, and cursor movement.

The camera 132 may include a lens and an image sensor. The camera 132 may use a plurality of lenses and image processing to support optical zoom or digital zoom. The recognition range of the camera 132 may be set variously depending on a camera angle and an ambient environment condition. When the camera 132 includes a plurality of cameras, the camera 132 uses the plurality of cameras to receive a three-dimensional (3D) still image or 3D motion.

The camera 132 may be implemented in one body with or separately from the image display apparatus 100b. A separate device including the separate camera 132 may be electrically connected with the image display apparatus 100b through the communication interface 150 or input/output interface 170.

It will be readily understood by those skilled in the art that the camera 132 may be excluded according to the performance and the structure of the image display apparatus 100b.

The light receiver 133 receives an optical signal (including a control signal) received from the external control apparatus 200 through an optical window of a bezel of the display 120. The light receiver 133 may receive an optical signal corresponding to a user input (e.g., a touch, press, touch gesture, voice, or motion) from the control apparatus 200. The control signal may be extracted from the received optical signal by control of the controller 110.

The input/output interface 170 receives a video (e.g., a moving picture), an audio (e.g., a sound or music), and additional information (e.g., EPG) from the outside of the image display apparatus 100b by control of the controller 110. The input/output interface 170 may include one of a high-definition multimedia interface (HDMI) port 171, a component jack 172, a PC port 173, and a USB port 174. The input/output interface 170 may include a combination of the HDMI port 171, the component jack 172, the PC port 173, and the USB port 174.

It will be readily understood by those skilled in the art that a configuration and an operation of the input/output interface 170 may be implemented in various ways according to an exemplary embodiment.

The controller 110 functions to control an overall operation of the image display apparatus 100b and a signal flow between the internal elements of the image display apparatus 100b and process data. When there is a user's input, or a predetermined stored condition is satisfied, the controller 110 may execute an operating system (OS) and various applications that are stored in the storage 190.

The controller 110 may include a random access memory (RAM) 181 that stores a signal or data received from the outside of the image display apparatus 100b or is used as storage regions corresponding to various tasks performed by the image display apparatus 100b, a read only memory (ROM) 182 that stores a control program for controlling the image display apparatus 100b, and a processor 183.

The processor 183 may include a graphic processor (GPU) for performing graphical processing corresponding to a video. The processor 183 may be implemented as a system on chip (SoC) including a core and the GPU. The processor 183 may include a single core, a dual core, a triple core, a quad core, and multiple cores thereof.

In addition, the processor 183 may include a plurality of processors. For example, the processor 183 may be implemented as a main processor and a sub processor that operates in a sleep mode.

A graphic processor 184 uses a calculator and a renderer to generate a screen including various objects such as an icon, image, text, or the like. The calculator uses the user input sensed through the sensor 130 to calculate attribute values, such as coordinates, forms, sizes, and colors in which the objects are displayed, according to a layout of the screen. The renderer generates a screen having various layouts including the objects on the basis of the attribute values calculated by the calculator. The screen generated by the renderer is displayed within a display region of the display 120.

First to n-th interfaces 185-1 to 185-n are connected with the above-described various types of elements. One of the interfaces may be a network interface connected with an external device through a network.

The RAM 181, the ROM 182, the processor 183, the graphic processor 184, and the first to n-th interfaces 185-1 to 185-n may be interconnected through an internal bus 186.

The term "controller of image display apparatus" used herein includes the processor 183, the ROM 182, and the RAM 181.

The storage 190 may store various types of data, programs, or applications for driving and controlling the image display apparatus 100b by control of the controller 110. The storage 190 may store input/output signals or data corresponding to the driving of the video processor 180, the display 120, the audio processor 115, the audio output interface 125, the power supply 160, the tuner 140, the communication interface 150, the sensor 130, and the input/output interface 170. The storage 190 may store control programs for controlling the image display apparatus 100b and the controller 110, an application initially provided by a manufacturer or downloaded from the outside, a graphical user interface (GUI) associated with the application, an object (e.g., an image text, icon, or button) for providing the GUI, user information, documents, databases, or relevant data.

In an exemplary embodiment, the term "storage" includes the storage 190, the ROM 182 or RAM 181 of the controller 110, or a memory card (e.g., a micro SD card or USB memory) mounted on the image display apparatus 100b. In addition, the storage 190 may include a nonvolatile memory, a volatile memory, a hard disk drive (HDD), and a solid state drive (SSD).

The storage 190 may include a broadcast receiving module, a channel control module, a volume control module, a communication control module, a voice recognition module, a motion recognition module, a light receiving module, a display control module, an audio control module, an external input control module, a power control module, a power control module of an external device that is wirelessly connected (e.g., via Bluetooth), a voice database (DB), or a motion DB. The modules and DBs of the storage 190 may be implemented in the form of software for the image display apparatus 100b to perform a broadcast reception control function, a channel control function, a volume control function, a communication control function, a voice recognition function, a motion recognition function, a light reception control function, a display control function, an audio control function, an external input control function, a power control function, or a power control function of an external device wirelessly connected (e.g., via Bluetooth). The controller 110 may perform each function using the software stored in the storage 190.

In addition, the image display apparatus 100b having the display 120 may be electrically connected with a separate external device (e.g., a set-top box) having a tuner. For example, it will be readily understood by those skilled in the art that the image display apparatus 100b may be implemented as an analog TV, a digital TV, a 3D TV, a smart TV, an LED TV, an OLED TV, a plasma TV, or a monitor, but is not limited thereto.

The image display apparatus 100b may include a sensor (e.g., an illumination sensor, a temperature sensor, etc.) that detects an internal or external state of the image display apparatus 100b.

The block diagram of the image display apparatus 100a or 100b shown in FIG. 2 or 3 is a block diagram for an exemplary embodiment. Elements of the block diagram may be integrated, added, or omitted according to a specification of the image display apparatus 100 that is actually implemented. That is, two or more elements may be combined into one element, or one element may be divided into two or more elements. In addition, a function performed in each block is intended to describe exemplary embodiments, and its detailed operations or devices do not limit the scope.

Figure 4:
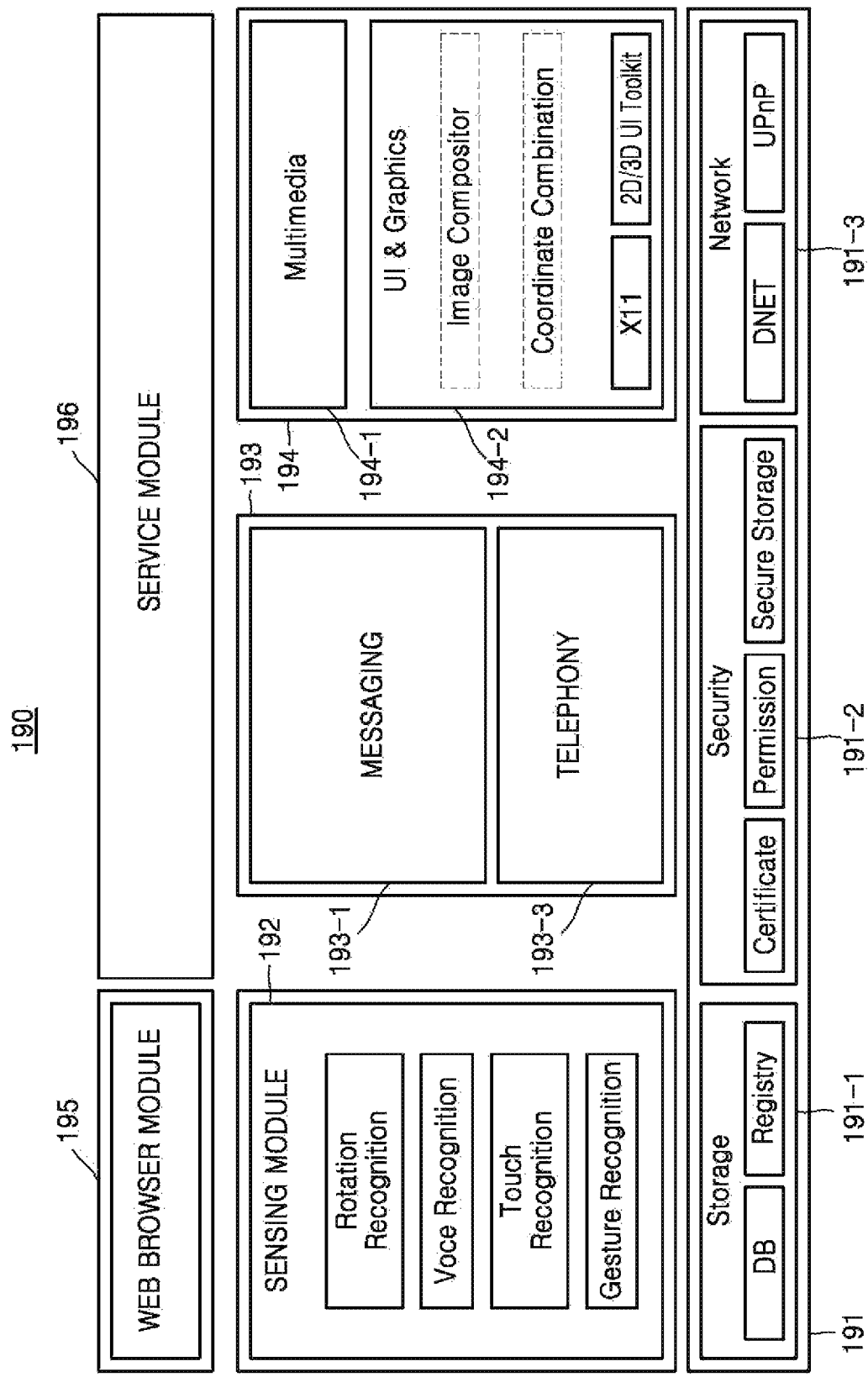
FIG. 4 is a diagram showing a software configuration stored in a storage of FIG. 3.

FIG. 4 is a diagram showing a software configuration stored in the storage 190 of FIG. 3.

Referring to FIG. 4, software including a base module 191, a sensing module 192, a communication module 193, a presentation module 194, a web browser module 195, and a service module 196 may be stored in the storage 190.

The base module 191 denotes a basic module that processes a signal delivered from hardware included in the image display apparatus 100 and delivers the delivered signal to an upper layer module. The base module 191 includes a storage module 191-1, a security module 191-2, and a network module 191-3. The storage module 191-1 is a program module that manages databases (DBs) or registries. The processor 183 may use the storage module 191-1 to access a database in the storage 190 and read various types of data. The security module 191-2 is a program module that supports certification, request permission, and secure storage of hardware. The network module 191-3 includes a DNET module, an UPnP module, and so on as a module for supporting network connection.

The sensing module 192 is a module that collects information from various types of sensors and analyzes and manages the collected information. The sensing module 192 may include a head direction recognition module, a face recognition module, a voice recognition module, a motion recognition module, an NFC recognition module, a rotation recognition module, a touch recognition module, and a gesture recognition module, and so on.

The communication module 193 is a module for communicating with the outside. The communication module 193 includes a messaging module 193-1 such as a messenger program, a short message service (SMS) & multimedia message service (MMS) program, or an email programs, and a telephony module 193-3 including a call information aggregator program module, a voice over Internet protocol (VoIP) module, and so on.

The presentation module 194 is a module for configuring a display screen. The presentation module 194 includes a multimedia module 194-1 for replaying and outputting multimedia content and a UI rendering module 194-2 for performing UI and graphic processing. The multimedia module 194-1 may include a player module, a camcorder module, a sound processing module, etc. Thus, the multimedia module 194-1 performs an operation of replaying various types of multimedia content to generate and replay a screen and a sound. The UI rendering module 194-2 may include an image compositor that combines images, a coordinate combination module that generates and combines coordinates of images to be displayed on the screen, an X11 module that receives various types of event from hardware, and a 2D/3D UI toolkit that provides a tool for configuring a 2D or 3D type UI.

The web browser module 195 denotes a module that performs web browsing to access a web server. The web browser module 195 may include various modules such as a web view module that configures a web page, a download agent module that performs downloading, a bookmark module, and a webkit module.

The service module 196 is a module including various types of applications for providing various services. In detail, the service module 196 may include an SNS program, a content replay program, a game program, an e-book program, a calendar program, a morning call management program, and other widgets.

In FIG. 4, various program modules are shown. However, it will be appreciated that the various program modules may be partially omitted, modified, or added according to the type and characteristic of the image display apparatus 100. For example, a location based module that supports a location based service in cooperation with hardware such as a global positioning system (GPS) chip.

Figure 5:
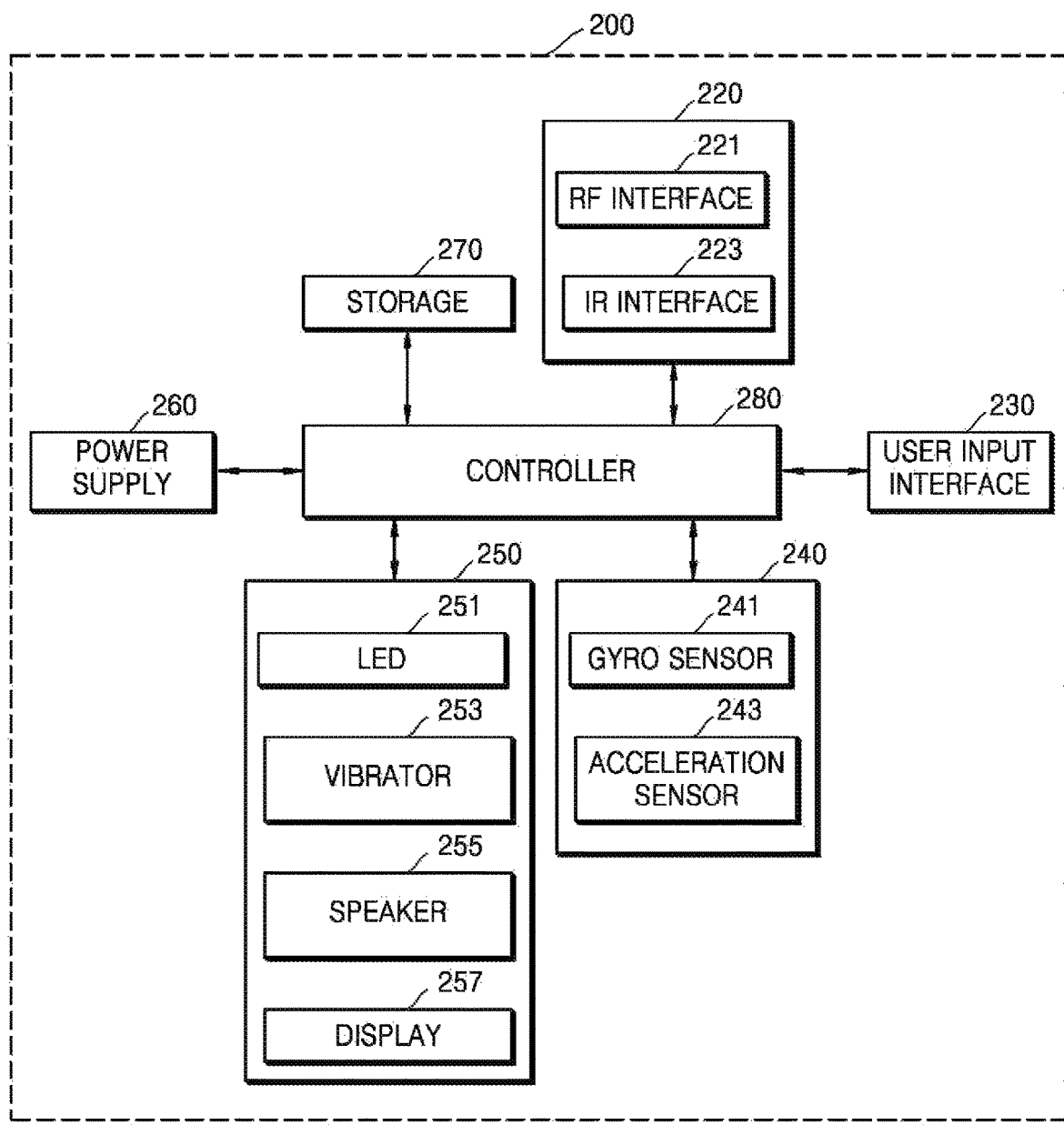
FIG. 5 is a block diagram showing a configuration of a control apparatus, according to an exemplary embodiment.

FIG. 5 is a block diagram showing a configuration of a control apparatus 200, according to an exemplary embodiment.

Referring to FIG. 5, the control apparatus 200 includes a wireless communication interface 220, a user input interface 230, a sensor 240, an output interface 250, a power supply 260, a storage 270, and a controller 280.

The wireless communication interface 220 may communicate signals with any one of the above-described image display apparatuses according to embodiments. The wireless communication interface 220 includes an RF interface 221 that may communicate signals with the image display apparatus 100 according to an RF communication standard. In addition, the control apparatus 200 includes an IR interface that may communicate signals with the image display apparatus 100 according to the IR communication standard.

In this embodiment, the control apparatus 200 transmits a signal containing information regarding movement of the control apparatus to the image display apparatus 100 through the RF interface 221.

In addition, the control apparatus 200 may receive a signal transmitted by the image display apparatus 100 through the RF interface 221. The control apparatus 200 may transmit a command for power on/off, channel change, volume adjustment, or the like to the image display apparatus 100 through the IR interface 223.

The user input interface 230 may include a keypad, a button, a touch pad, or a touch screen. A user may manipulate the user input interface 230 to input a command associated with the image display apparatus 100 to the control apparatus 200. When the user input interface 230 includes a hard key button, the user may input a command associated with the image display apparatus 100 to the control apparatus 200 through an operation of pushing the hard key button. When the user input interface 230 includes a touch screen, the user may touch a soft key of the touch screen to input a command associated with the image display apparatus 100 to the control apparatus 200.

For example, the user input interface 230 may include four direction buttons or keys. The four-direction button or key may be used to control a window, region, application, or item that is displayed on the display 120. The four direction keys or buttons may be used to indicate up, down, left, and right movements. It will be understood by those skilled in the art that the user input interface 230 may include two direction keys or buttons, instead of the four direction buttons or keys.

In addition, the user input interface 230 may include various types of input interfaces, such as a scroll key or a jog key, which may be manipulated by the user.

The user input interface 230 may include a touch pad. The user input interface 230 according to an exemplary embodiment may receive a user input such as drag, touch, or flip through the touch pad of the control apparatus 200. The image display apparatus 100 may be controlled according to the type of the received user input (e.g., a direction in which a drag command is input, or a time at which a touch command is input).

The sensor 240 includes a gyro sensor 241 and an acceleration sensor 243. The gyro sensor 241 may sense information regarding movement of the control apparatus 200. As an example, the gyro sensor 241 may sense information regarding an operation of the control apparatus 200 with respect to x, y, and z axes. The acceleration sensor 243 may sense information regarding a moving speed of the control apparatus 200. The sensor may further include a distance measuring sensor and thus may sense a distance with the image display apparatus 100.

The output interface 250 may output a video or voice signal corresponding to manipulation of the user input interface 230 or corresponding to a signal received from the image display apparatus 100. Through the output interface 250, the user may determine whether to adjust the user input interface 230 or whether to control the image display apparatus 100.

As an example, the output interface 250 may include an LED 251, a vibrator 253, a speaker 255, and a display 257. When a signal is communicated with the image display apparatus 100 by manipulating the user input interface 230 or through the wireless communication interface 220, the LED 251 is lit up, the vibrator 253 generates vibration, the speaker 255 outputs a sound, and/or the display 257 outputs an image.

The power supply 260 supplies power to the control apparatus 200. When the control apparatus 200 has not moved for a period of time, the power supply 260 may stop supplying power, thus reducing power dissipation. The power supply 260 may resume the power supply when a key included in the control apparatus 200 is manipulated.

The storage 270 may store various types of programs and application data in control or operation of the control apparatus 200.

The controller 280 controls an overall operation associated with the control of the control apparatus 200. The controller 280 may transmit a signal corresponding to manipulation of a key of the user input interface 230 or a signal corresponding to movement of the control apparatus 200 sensed by the sensor 240 to the image display apparatus 100 through the wireless communication interface 220.

The image display apparatus 100 may include a coordinate calculator that may calculate coordinates of the cursor corresponding to an operation of the control apparatus 200.

The coordinate calculator may correct a hand tremble or error from a signal corresponding to a sensed operation of the control apparatus 200 to calculate coordinates (x, y) of the cursor to be displayed on the display 120.

In addition, a transmission signal of the control apparatus 200 that is sensed through the sensor 130 is transmitted to the controller 110 of the image display apparatus 100. The controller 110 may determine information regarding the operation and key manipulation of the control apparatus 200 on the basis of the signal transmitted by the control apparatus 200 and may control the image display apparatus 100 according to a result of the determination.

As another example, the control apparatus 200 may calculate coordinates of the cursor corresponding to the operation and transmit the calculated coordinates to the image display apparatus 100. In this case, the image display apparatus 100 may transmit information regarding the coordinates of the cursor, which is received without a separate operation of correcting a hand tremble or error, to the controller 110.

Figure 6:
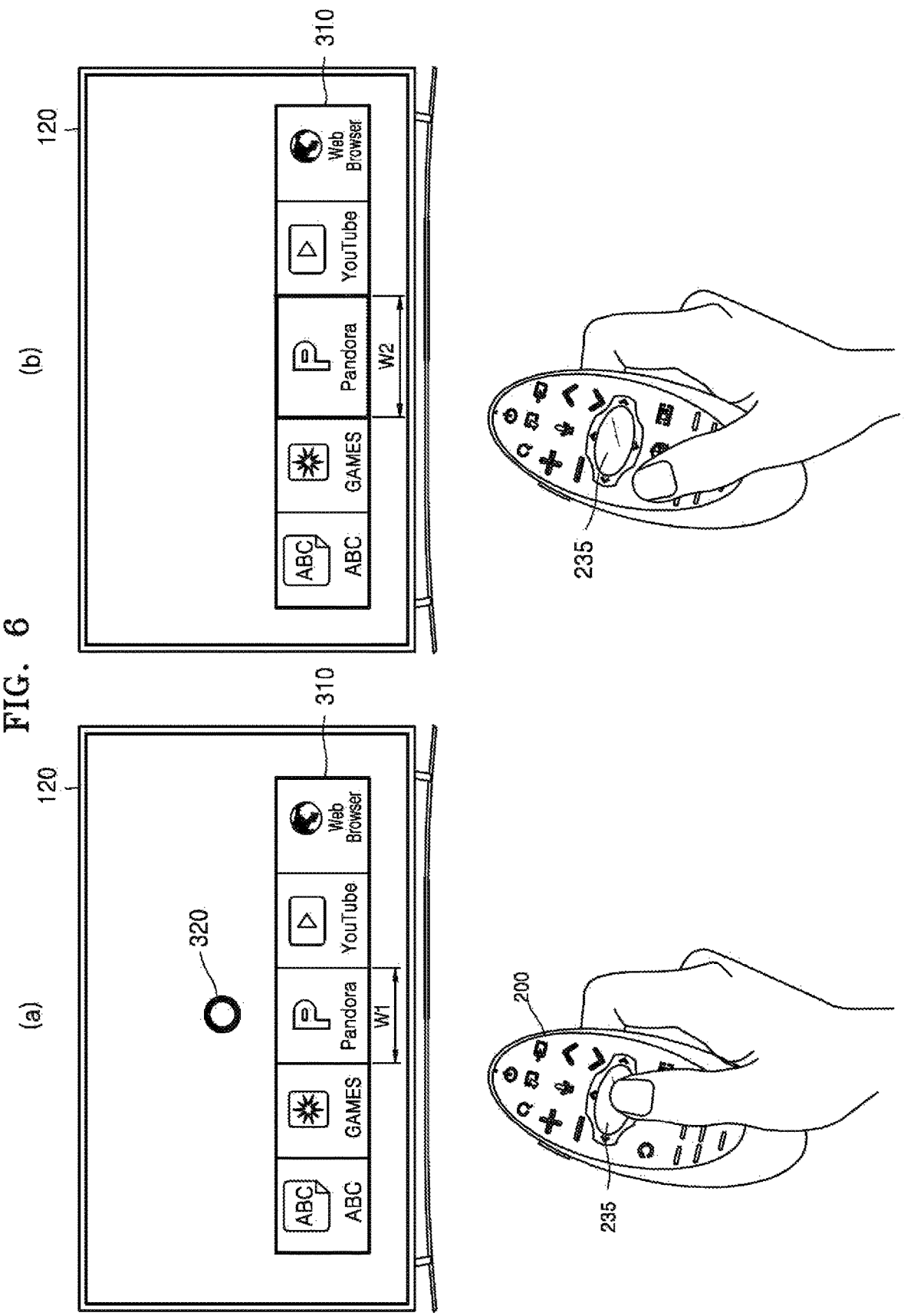
FIG. 6 is a diagram showing a pointing mode and a four-direction mode of an image display apparatus, according to an exemplary embodiment.

FIG. 6 is a diagram showing a pointing mode and a four-direction mode of the image display apparatus 100, according to an exemplary embodiment.

Referring to portions (a) and (b) of FIG. 6, the display 120 displays an item list 310 including a plurality of items. For example, the display 120 may display a plurality of items, each of which indicates content. The item indicating content may include an item indicating video content such as a movie or soap opera, an item indicating audio content such as music, an item indicating an application, an item indicating a broadcast channel, and an item indicating history information of content that has been executed by a user.

The plurality of items may be displayed as images. For example, when the item is an item indicating content regarding a movie or soap opera, the item may be displayed as a poster image of the movie or soap opera. When the item is an item indicating audio content such as music, the item may be displayed as a poster image of an album including the music. When the item is an item indicating an application, the item may be displayed as an image that represents the application or an application screen that is finally executed. When the item is an item indicating a broadcast channel, the item may be displayed as a screen image that is finally watched by a user or an image that indicates a currently broadcast program on the channel. When the item is an item indicating history information of content that has been executed by a user, the item may be displayed as a screen image of the content that is finally executed.

In addition, the display 120 may display an item indicating an interface for connecting the image display apparatus 100 with an external device or a plurality of items indicating external devices connected with the image display apparatus. For example, the item indicating the interface for connecting the image display apparatus 100 with the external device may be an item indicating a port of the image display apparatus to which the external device is connected. For example, an item indicating the external device may include an item indicating a high-definition multimedia interface (HDMI) port, an item indicating a component jack, an item indicating a PC port, and an item indicating a USB port. In addition, the item indicating the external device may be an item indicating an external device connected to the interface.

Referring to the portions (a) and (b) of FIG. 6, the display 120 displays the item list 310 including quadrangular items at the bottom of the display 120, and the quadrangle indicating the items is a rectangle with a width smaller than a height. In addition, the plurality of items may have the same width or different widths according to the type or characteristic of content corresponding to each of the plurality of items.

As shown in the portions (a) and (b) of FIG. 6, the item list 310 has a form in which the plurality of items is arranged in a traverse direction. When the number of items included in the item list 310 is a predetermined number, some of the plurality of items may be displayed on the display 120, and the item list 30 may be scrolled to the left or right. In addition, when the item list 310 is scrolled to the left or right, items that have not been displayed may be displayed. The item list 310 may have a form in which the plurality of items is arranged in a longitudinal direction.

Referring to the portion (a) of FIG. 6, when an input of touching a touch region 235 of the control apparatus 200 is sensed, or when a predetermined button of the user input interface of the control apparatus 200 is pressed, the control apparatus 200 may transmit a key to the image display apparatus 100. When a key input is received from the control apparatus 200, the image display apparatus 100 may operate in a pointing mode. When the image display apparatus 100 operates in the pointing mode, the image display apparatus 100 displays a cursor 320 to the display 120, and may receive a pointing signal from the control apparatus 200 to move the cursor 320.

For example, the image display apparatus 100 may receive information regarding movement of the control apparatus that is sensed through a sensor of the control apparatus 200, calculate coordinates of the cursor 320 on the display 120, and move the cursor 320 in accordance with the calculated coordinates.

Alternatively, on a condition that the control apparatus 200 includes a touch pad, the image display apparatus 100 may move the cursor 320 on the display 120 according to a displacement of a subject such as a user's finger that moves on the touch pad.

In the portion (a) of FIG. 6, the cursor 320 is shown to be a circle, but is not limited thereto. The cursor 320 may have various shapes and sizes. The shape and size of the cursor 230 may be set variously on the basis of a user input. The cursor 320 may be positioned in any one of a plurality of items included in the item list 310. When the cursor 320 is positioned in any one of the plurality of items, the item may be highlighted. In this disclosure, the highlighted item may be referred to as a fovea.

On the contrary, as shown in the portion (b) of FIG. 6, when the touch region 235 of the control apparatus 200 is not touched, or a predetermined button of the control apparatus 200 is not pressed, the image display apparatus 100 may operation in a four-direction mode. When the image display apparatus 100 operates in the four-direction mode, any one of the plurality of items included in the item list may be highlighted. For example, when the item is highlighted, a quadrangular box is displayed along the edge of the item, or the width of the item is changed from first width W1 to second width W2. Alternatively, opacity of an image displayed in the item may be changed.

When the image display apparatus 100 operates in the four-direction mode, the image display apparatus 100 may receive an input of pressing one of four direction keys or buttons of the control apparatus 200 and change the highlighted item in the item list. For example, when an input of a right direction button is sensed among the four direction buttons, an item adjacent to the right of the currently highlighted item may be highlighted. For example, a quadrangular box may be displayed along the edge of the item adjacent to the right, or the width of the item may be changed.

When the image display apparatus 100 receives an IR signal from the control apparatus 200 while operating in the pointing mode, the image display apparatus 100 may be switched to the four-direction mode. For example, when the image display apparatus 100 receives an input of pressing one of the four direction keys or buttons while operating in the pointing mode, the image display apparatus 100 may be switched to the four-direction mode. The image display apparatus 100 may not display the cursor on the display 120, and any one of the plurality of items included in the item list may be highlighted.

In addition, when the image display apparatus 100 receives a pointing signal form the control apparatus 200, instead of the IR signal, while operating in the four-direction mode, the image display apparatus 100 may be switched to the pointing mode.

When the image display apparatus 100 senses a user input of selecting the highlighted item, the image display apparatus 100 may perform an operation corresponding to the item. For example, on a condition that the highlighted item is an application indicating an application, upon sensing the input of selecting the highlighted item, the image display apparatus 100 may execute the application. In addition, the display 120 may display an execution screen of the application. In this case, when a predetermined key input of the control apparatus 200 is sensed, the image display apparatus 100 may end the operation of the application. For example, when the image display apparatus 100 sense an input of long-pressing any one of four direction keys of the control apparatus 200, the image display apparatus 100 may stop displaying the execution screen of the application and perform control such that a screen including the item list to be displayed back again.

FIGS. 7A, 7B, and 7C are diagrams showing a gap between a highlighted item and an item adjacent to the highlighted item being changed with movement of a cursor 420, according to an exemplary embodiment.

Referring to FIG. 7A, the display 120 displays an item list 410 including quadrangular items at the bottom of the display 120. The item list 410 has a form in which the plurality of items 431 to 435 are arranged in a traverse direction, and the plurality of items may have the same width. For convenience of description, it is assumed that the item list includes five items.

The image display apparatus 100 may operate in the pointing mode described in the portion (a) of FIG. 6. Thus, the display 120 displays the cursor 420 indicating a position of a user input, and the controller 110 may move the cursor 420 to the display 120 in accordance with the sensed user input.

When the cursor 420 according to an exemplary embodiment is positioned on a central line of a first item 431 among items included in an item list 410, the image display apparatus 100 changes a gap (a first gap g1) between the first item 431 and a second item 432 adjacent to the first item 431 and a gap (a second gap g2) between the first item 431 and a third item 433 adjacent to the first item 431 to a maximum gap that adjacent items may have.

In addition, the image display apparatus 100 changes a gap between the other adjacent items to a minimum gap (which is a minimum gap which adjacent items may have). For example, a gap between a fourth item 434 (an item that is not adjacent to the highlighted item) and the second item is zero. In addition, a gap between a fifth item 435 and the first item 433 is zero.

The image display apparatus 100 may sense a user input of moving the control apparatus 200 up, down, left, or right or tilting the control apparatus 200. For example, the image display apparatus 100 may sense a direction and a degree of movement of the control apparatus 200 and move the cursor 420 on the display 120 according to the sensed movement. In addition, the image display apparatus 100 may move the cursor 420 on the display 120 in a direction of a touch input that is sensed by the touch panel of the control apparatus 200.

As shown in FIG. 7B, when a user input of moving the control apparatus 200 right is sensed, the image display apparatus 100 moves the cursor 420 displayed on the display 120 to the right in accordance with the input interface. In this case, information regarding movement of the control apparatus 200 that is sensed through a sensor of the control apparatus 200 may be transmitted to the image display apparatus 100. The image display apparatus 100 may calculate coordinates of the cursor 420 from the information regarding the movement of the control apparatus 200 and move the cursor 420 on the display 120 in accordance with the calculated coordinates.

As shown in FIG. 7B, as the cursor 420 is moved to the right (the cursor 420 becomes far from the a central line of the first item 431 and becomes close to the third item 433 that is positioned to the right of the first item 431), the image display apparatus 100 gradually decreases the first gap g1 between the first item 431 and the second item 432 and gradually increase a gap (a third gap g3) between the third item 433 and the fifth item 435.

According to an exemplary embodiment, a degree of decrease in the first gap g1 between the first item 431 and the second item 432 may be the same as a degree of increase in the third gap g3 between the third item 433 and the fifth item 435. In addition, the second gap g2 between the first item 431 and the third item 433 is maintained at a constant width. Thus, a width W3 of the item list 410 is maintained at a constant width when the cursor 420 is positioned on the central line of the first item 431 (a case shown in FIG. 7A) and when the cursor 420 moves toward the third item 433 (a case shown in FIG. 7B).

In addition, as shown in FIG. 7C, when the cursor 420 is continuously moved to the right and positioned on a central line of the third item 433, the image display apparatus 100 changes the third gap g3 between the third item 433 and the fifth item 435 to a maximum gap, and the third gap g3 between the third item 433 and the fifth item 435 is the same as the second gap g2 between the third item 433 and the first item 431.

In addition, the image display apparatus 100 changes the first gap g1 between the first item 431 and the second item 432 to a minimum gap (e.g., zero). Thus, the width W3 of the item list 410 is maintained at a constant width when the cursor 420 is positioned on the central line of the first item 431 (a case shown in FIG. 7A) and when the cursor 420 is positioned on the central line of the third item 433 (a case shown in FIG. 7C).

Figure 8A:
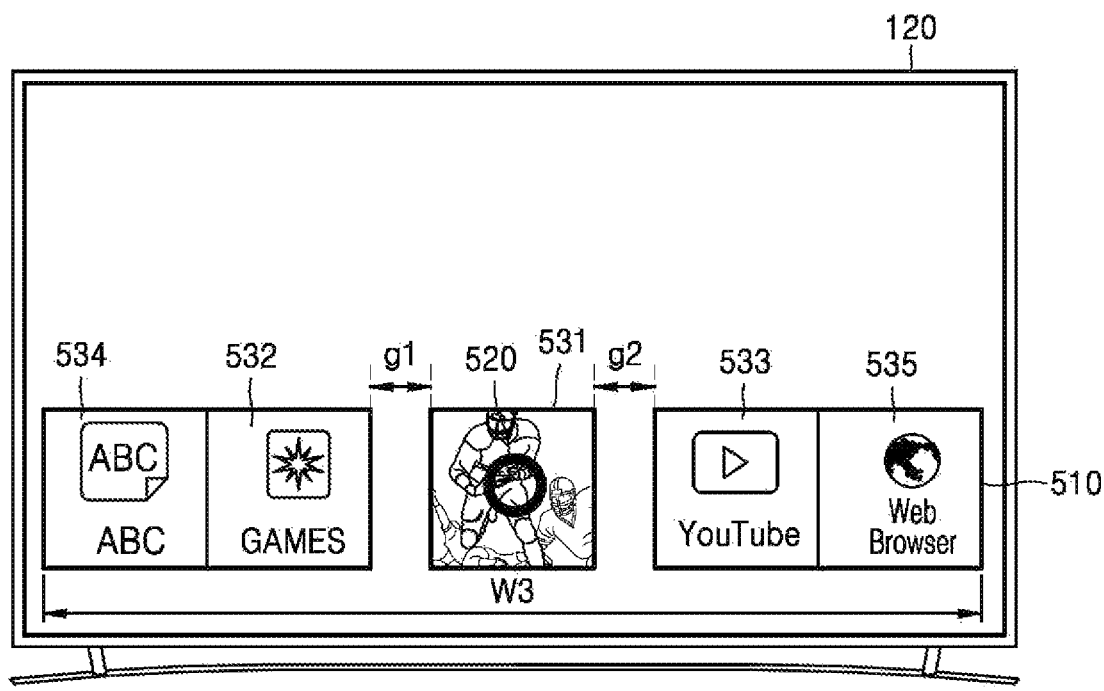

FIGS. 8A, 8B, and 8C are diagrams showing opacity of an image displayed in a highlighted item and an item adjacent to the highlighted item being changed with movement of a cursor 520, according to an exemplary embodiment.

Referring to FIG. 8A, the display 120 displays an item list 510 including a plurality of items at the bottom of the display 120. The item list 510 has a form in which the plurality of items 531, 532, 533, 534, and 535 are arranged in a traverse direction, and each of the plurality of items may include an item representing content.

The image display apparatus 100 may operate in the pointing mode described in the portion (a) of FIG. 6. Thus, the display 120 displays the cursor 520 indicating a position of a user input, and the controller 110 may move the cursor 520 on the display 120 in accordance with the sensed user input.

According to an exemplary embodiment, each of the plurality of items includes a normal image and a fovea image. For example, a normal image of an item may include a representative image or a representative text that represents content. A fovea image of an item may include an image representing a final execution screen, using a program corresponding to the item. However, exemplary embodiments are not limited thereto.

According to an exemplary embodiment, when an item is highlighted and a cursor is positioned on a central line of the item, opacity of a fovea image of the item may have a maximum value, and opacity of a normal image of the item may have a minimum value. As the cursor becomes far from the central line of the item, the opacity of the fovea image may decrease gradually, and the opacity of the fovea image may increase gradually. In addition, the item may be displayed as an image obtained by combining the fovea image and the normal image according to the opacity of the fovea image and the opacity of the normal image.

For example, referring to FIG. 8A, when the cursor 520 is positioned on a central line of a first item 531 among the items included in the item list 510, the first item 531 is displayed as a first image (fovea image). That is, opacity of the first image (fovea image) of the first item 531 has a maximum value, and opacity of a second image (normal image) of the first item 531 is zero.

In addition, when the cursor 520 is positioned on the central line of the first item 531, a second item 533 adjacent to the right of the first item 531 is displayed as a fourth image (normal image). That is, opacity of the fourth image (normal image) of the second item 532 has a maximum value, and opacity of a third image (fovea image) of the second item 533 is zero.

As shown in FIG. 8B, when a user input of moving the control apparatus 200 right is sensed, the image display apparatus 100 moves the cursor 520 displayed on the display 120 to the right in accordance with the user input.

As shown in FIG. 8B, as the cursor 520 is moved to the right (the cursor 520 becomes far from the a central line of the first item 531 and becomes close to a central line of the second item 533), the opacity of the first image (fovea image) of the first item 531 decreases and the opacity of the second image (normal image) of the first item 531 increases. The first item 531 is displayed as an image obtained by combining the first image and the second image on the basis of the opacity of the first image and the opacity of the second image.

In addition, as the cursor 520 is moved to the right, the opacity of the third image (fovea image) of the second item 533 increases and the opacity of the fourth image (normal image) of the second item 533 decreases. The second item 533 is displayed as an image obtained by combining the third image and the fourth image on the basis of the opacity of the third image and the opacity of the fourth image.

In addition, as shown in FIG. 8C, when the cursor 420 is continuously moved to the right and positioned on the central line of the second item 433, the opacity of the first image (fovea image) of the first item 431 is zero, and the opacity of the second image (normal image) has a maximum value. Thus, the first item 431 is displayed as the second image (normal image). In addition, the opacity of the third image (fovea image) of the second item 433 has a maximum value, and the opacity of the fourth image (normal image) of the second item 433 is zero. Thus, the second item 433 is displayed as the third image (fovea image).

FIGS. 9A, 9B, and 9C are diagrams showing an attribute of an item being changed when a cursor 620 is moved from a region in which an item list 610 is not displayed to a region 650 in which the item list 610 is displayed, according to an exemplary embodiment.

Referring to FIG. 9A, the display 120 displays the item list 610 in which a plurality of items are arranged in a transverse direction at the bottom of the display 120. For example, when the item list in which the plurality of items are arranged in the transverse direction is displayed, an activation region is defined as the region 650 that extends a determined distance in a longitudinal direction (a y-axis direction) from a region in which the item list 610 is displayed. Thus, the activation region 650 may be defined on the basis of the y-coordinate of the display 120.

In the activation region 650, the image display apparatus 100 sets an item list region in which the item list 610 is displayed as a first region 651, and sets a region in which the item list 610 is not displayed as a second region 652. In addition, the image display apparatus 100 sets a remaining region other than the activation region 650 as a deactivation region.

On the contrary, when an item list in which the plurality of items are arranged in a longitudinal direction is displayed, the activation region may be set on the basis of the x-coordinate of the display and may be defined as a region that extends a predetermined distance in a transverse direction (a x-axis direction) from the item list region.

When the cursor 620 is moved from the deactivation region to the activation region along the central line of a first item 631 included in the item list 610, the image display apparatus 100 according to an exemplary embodiment may change a gap between the first item and an item adjacent to the first item and opacity of an image displayed in the first item.

Referring to FIG. 9A, when the cursor 620 is positioned in the deactivation region, attributes of the plurality of items included in the item list 610 are not changed. That is, a gap between the first item 631 and an item adjacent to the first item 631 is a minimum gap (e.g., zero). In addition, the opacity of the normal image displayed in the first item 631 has a maximum value, and the opacity of the fovea image displayed in the first item 631 has a minimum value. Thus, the first item 631 is displayed as the normal image.

As shown in FIG. 9B, when a user input of moving the control apparatus 200 down is sensed, the image display apparatus 100 moves the cursor 620 displayed on the display 120 down in accordance with the user input.

As the cursor 620 is moved down, the cursor 620 is moved to the second region 652 in the item activation region 650, an attribute of an item corresponding to a position of the cursor 620 may be changed and displayed.

For example, when the cursor 620 is positioned in the item activation region 650, the image display apparatus 100 may determine an item corresponding to the position of the cursor 620 among the plurality of items included in the item list 610.

When the plurality of items are disposed in the transverse direction, the image display apparatus 100 may determine whether the x-coordinate indicating the position of the cursor 620 is included in the range of an x-coordinate of each of the plurality of items and thus determine the item corresponding to the position of the cursor 620. For example, as shown in FIG. 9B, when the x-coordinate indicating the position of the cursor 620 is included in the range of x-coordinate in a region in which the first item 631 is displayed, the image display apparatus 100 determines the first item 631 as the item corresponding to the position of the cursor 620.

In addition, the image display apparatus 100 may change a gap between the determined item and an item adjacent to the determined item. Alternatively, opacity of an image displayed in the determined item may be changed. For example, the image display apparatus 100 may change an attribute of the first item 631 corresponding to the cursor 620.

In this case, as the cursor becomes close to the first region 651 of the activation region, the image display apparatus 100 increases the first and second gaps g1 and g2 between the first item and items adjacent to the first item.

Thus, items positioned in the left of the first item 631 are moved to the left, and items positioned in the right of the first item 631 are moved to the right.

In addition, as the cursor 620 becomes close to the first region 651 of the activation region, the image display apparatus 100 decreases the opacity of the normal image displayed in the first item 631 and increases the opacity of the fovea image displayed in the first item 631. Thus, the first item 631 is displayed as an image obtained by combining the fovea image and the normal image according to the opacity of the fovea image and the opacity of the normal image.

As shown in FIG. 9C, when the cursor 620 is continuously moved down and positioned in the first region 651 of the item activation region 650, the image display apparatus 100 changes the first and second gaps g1 and g2 between the first item and items adjacent to the first item to a maximum gap. The image display apparatus 100 changes the opacity of the normal image displayed in the first item 631 to a minimum value and changes the opacity of the fovea image displayed in the first item 631 to a maximum value. Thus, the first item 631 is displayed as the fovea image.

As shown in FIGS. 9A and 9C, when the cursor 620 moves from the deactivation region to the activation region 650 without changing the x-coordinate, the degree of change in each item attribute (e.g., a gap between items, opacity of an image of an item, etc.) may also be increased.

FIG. 10 is a diagram showing an attribute of an item being changed when a pointing mode is switched to a four-direction mode, according to an exemplary embodiment.

Referring to portion (a) of FIG. 10, the display 120 displays an item list 710 in which a plurality of items 731 to 733 are arranged in a transverse direction. The image display apparatus 100 may operate in the pointing mode described in the portion (a) of FIG. 6. Thus, the display 120 displays a cursor 720 indicating a position of a user input, and the controller 110 may move the cursor 720 on the display 120 in accordance with the sensed user input.

When the cursor 720 according to an exemplary embodiment is positioned on a central line of a first item 731 among items included in the item list 710, as shown in FIG. 7A, the image display apparatus 100 changes a gap (a first gap g1) between the first item 731 and a second item 732 adjacent to the first item 731 and a gap (a second gap g2) between the first item 731 and a third item 733 adjacent to the first item 731 to a maximum gap.

In addition, opacity of a fovea image of the first item 731 has a maximum value, and opacity of a normal image of the first item 731 has a minimum value. Thus, the first item 631 is displayed as the fovea image.

Upon receiving a four-direction mode switching input, the image display apparatus 100 may be switched to a four-direction mode. For example, when the touch region 235 of the control apparatus 200 is not touched, a predetermined button of the control apparatus 200 is not pressed, an IR signal is received, or a pointing signal is not received, the image display apparatus 100 may be switched to the four-direction mode.

When the image display apparatus 100 is switched to the four-direction mode, as shown in portion (b) of FIG. 10, the display 120 does not display a cursor. In addition, a first item 731 on which the cursor has been positioned is highlighted. For example, a quadrangular box is displayed along the edge of the item 731, and the width of the item 731 is changed from a first width W1 to a second width W2. In this case, the second width W2 of the first item 731 may be a value obtained by summing the first width W1 (a default width) of the first item, a maximum gap between the first item and the third item 733 positioned in the right of the first item, and a maximum gap between the first gap and the second item positioned in the left of the first item.

The image display apparatus 100 may be switched to a pointing mode when receiving a pointing mode switching input while operating in the four-direction mode. For example, when an input of touching the touch region 235 of the control apparatus 200 is sensed, a predetermined button of the user input interface of the control apparatus 200 is pressed, an IR signal has not been received for a predetermined time, or a pointing signal is received, the image display apparatus 100 may be switched to the pointing mode.

When the image display apparatus 100 is switched to the pointing mode, as shown in the portion (a) of FIG. 10, the display displays the cursor 720 in the first item 731 (an item that is currently highlighted) and changes the width of the first item from the second width W2 to the first width W1, In addition, the first item 731 has a maximum gap with the second item 732 positioned in the left of the first item and with the third item 733 positioned in the right of the first item.

FIGS. 11A and 11B are diagrams showing the image display apparatus 100 operating in a four-direction mode, according to an exemplary embodiment.

Referring to FIG. 11A, the display 120 displays an item list 810 including quadrangular items at the bottom of the display 120. The item list 810 has a form in which a plurality of items is arranged in a transverse direction.

When the image display apparatus 100 operates in the four-direction mode, any one of the plurality of items included in the item list 810 may be highlighted. For example, the image display apparatus 100 may highlight any one of the plurality of items by displaying a quadrangular box along the edge of the item. For example, as shown in FIG. 11A, the width of the highlighted item (a first item 831) is second width W2, which is described in FIG. 10. In addition, the first item 831 is displayed as a fovea image of the first item 831. That is, opacity of the fovea image of the first item 831 has a maximum value, and opacity of a normal image of the first item 831 has a minimum value.

The image display apparatus 100 may receive an input of moving the highlight. Upon receiving an input of pressing any four-direction key or button of the control apparatus 200, the image display apparatus 100 may change an item to be highlighted. For example, as shown in FIG. 11B, when an input of a right direction button is sensed among direction buttons, the image display apparatus 100 highlights a second item 832 adjacent to the right of the first item 831 in accordance with the sensed input. The image display apparatus 100 displays a quadrangular box along an edge of the second item 832. The image display apparatus 100 changes the width of the first item 831 from second width W2 to first width W1 and changes the width of the second item 832 from first width W1 to second width W2.

In addition, the image display apparatus 100 changes opacity of the images such that the first item 831 is displayed as a normal image of the first item 831. For example, the image display apparatus 100 changes the opacity of the images such that opacity of the fovea image of the first item 831 has a minimum value and opacity of the normal image of the first item 831 has a maximum value. On the contrary, the image display apparatus 100 changes the opacity of the images such that the highlighted second item 832 is displayed as a fovea image of the second item 832. For example, the image display apparatus 100 changes the opacity of the images such that opacity of the fovea image of the second item 832 has a maximum value and opacity of the normal image of the second item 832 has a minimum value.

Figure 12:
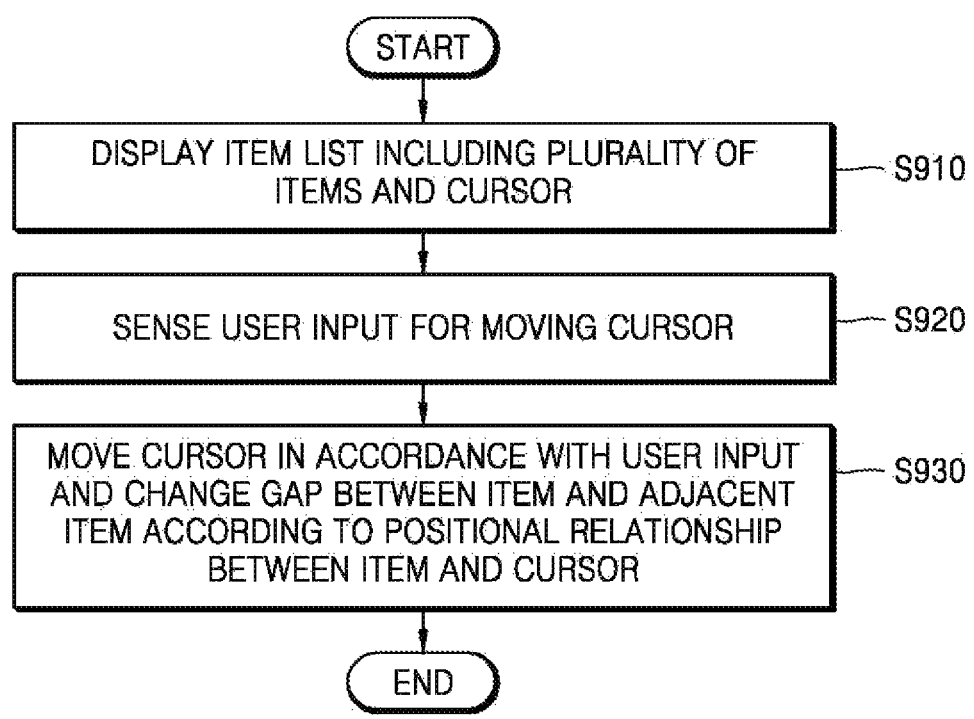
FIG. 12 is a flowchart showing an image display method, according to an exemplary embodiment.

FIG. 12 is a flowchart showing an image display method, according to an exemplary embodiment.

Referring to FIG. 12, in operation S910, the image display apparatus 100 displays an item list including a plurality of items and a cursor indicating a position of a user input on the display 120.

For example, the item list according to an exemplary embodiment may include an item indicating content, an item indicating an interface for connecting to an external device, or an item indicating an external device connected with the image display apparatus. The item list may have a form in which a plurality of items are arranged in a transverse direction or a longitudinal direction.

When a key input is received from the control apparatus 200, the image display apparatus 100 may display the cursor on the display 120.

In operation S920, the image display apparatus 100 senses a user input for moving the cursor.

For example, the image display apparatus 100 may sense a user input of moving the control apparatus 200 up, down, left, or right or tilting the control apparatus 200.

In operation S930, the image display apparatus 100 moves the cursor on the display 120 in accordance with the user input and changes a gap between at least one item among the plurality of items and an item adjacent to the at least one item according to a positional relationship between the cursor and the at least one item.

For example, the image display apparatus 100 may sense a direction and a degree of movement of the control apparatus 200 and move a cursor 520 on the display 120 according to the sensed movement. In addition, the image display apparatus 100 may move the cursor 520 on the display 120 in a direction of a touch input that is sensed by the touch panel of the control apparatus 200.

When the cursor is positioned in an item region of any one of the plurality of items, the item may be highlighted. The image display apparatus 100 may continuously change a gap between a first item (the highlighted item) on which the cursor is positioned and a second item adjacent to the first item.

For example, when the cursor is positioned on a central line of the first item, the image display apparatus 100 may change the gap between the first item and the second item to a maximum gap. As the cursor becomes far from the central line of the first item, the image display apparatus 100 may continuously decrease the gap between the first item and the second item.

According to an exemplary embodiment, a user's cognitive fatigue may be reduced because attributes of items included in an item list according to a position of a cursor are continuously changed.

According to an exemplary embodiment, an accuracy of selection of an item may increase when the item included in the item list is selected using a cursor.

According to an exemplary embodiment, a user may be provided with various feelings by variously modifying a graph that shows a relationship between a first parameter and an item attribute.

In addition, the exemplary embodiments may also be implemented through computer-readable code and/or instructions on a medium, e.g., a computer-readable medium, to control at least one processing element to implement any above-described embodiments. The medium may correspond to any medium or media which may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image display method comprising:
    displaying an item list including items represented by images, and a cursor controlled by a user input indicating a movement of a remote control apparatus;
    sensing the movement of the user input;
    moving the cursor based on the movement of the user input; and
    varying gaps between the items of the item list according to a position of the cursor,
    wherein the varying comprises, based on the position of the cursor being on a first item corresponding to the movement of the user input received from the remote control apparatus, automatically increasing a first gap between the first item and a second item adjacent to the first item and a second gap between the first item and a third item adjacent to the first item, and varying the gaps between the items based on a direction of the movement of the cursor,
    wherein the varying comprises:
        in response to the cursor based on the sensed movement of the user input being positioned on a central line of the first item among the items, changing the first gap and the second gap to a maximum gap which adjacent items have, and
        according to the cursor moving from the central line of the first item to the third item, gradually reducing a size of the first gap and gradually increasing a size of a third gap between the third item and a fourth item adjacent to the third item until the cursor is positioned on a central line of the third item.

2. The image display method of claim 1, wherein the varying comprises:
    obtaining a distance between the cursor and the central line of the first item; and
    continuously increasing the first gap as the distance between the cursor and the central line of the first item becomes smaller.

3. The image display method of claim 1, wherein the varying comprises:
    continuously decreasing the first gap as the cursor is moved from the central line of the first item.

4. The image display method of claim 1, wherein the varying comprises:
    continuously decreasing the first gap, and maintaining the second gap, as the cursor is moved from the central line of the first item to a central line of the third item; and
    changing the first gap to a minimum gap in response to the cursor being positioned on the central line of the third item.

5. The image display method of claim 4, wherein the varying comprises:
    setting a third gap between the third item and the fourth item to a minimum gap in response to the cursor being positioned on the central line of the first item;

continuously increasing the third gap as the cursor is moved from the central line of the first item to the central line of the third item; and changing the third gap to the maximum gap in response to the cursor being positioned on the central line of the third item.

6. The image display method of claim 1, further comprising changing opacity of an image among a plurality of images of the first item based on a distance between the cursor and the first item, wherein the plurality of images of each item of the item list includes at least a first image as a fovea image and a second image as a normal image.

7. The image display method of claim 6, wherein the first item is represented by the first image among the plurality of images, and the changing the opacity comprises:
changing opacity of the first image to a maximum value in response to the cursor being positioned on the central line of the first item to display the first item as the first image; and
continuously decreasing the opacity of the first image as the cursor is moved from the central line of the first item.

8. The image display method of claim 7, wherein the first item is represented by the second image among the plurality of images, and the changing the opacity comprises:
changing opacity of the second image to a minimum value in response to the cursor being positioned on the central line of the first item; and
continuously increasing the opacity of the second image as the cursor is moved from the central line of the first item.

9. The image display method of claim 6, wherein the changing the opacity comprises:
changing opacity of the first image, among the plurality of images of the first item to a maximum value, and changing opacity of the second image, among the plurality of images of the first item to a minimum value, in response to the cursor being positioned on the central line of the first item to display the first item as the first image;
continuously decreasing the opacity of the first image, and continuously increasing the opacity of the second image, as the cursor is moved from the central line of the first item to a central line of the second item; and
changing the opacity of the first image to the minimum value, and changing the opacity of the second image to the maximum value, in response to the cursor being positioned on the central line of the second item to display the first item as the second image.

10. The image display method of claim 9, wherein the changing the opacity comprises:
changing opacity of a third image, among the plurality of images, of the second item to the minimum value, and changing opacity of a fourth image, among the plurality of images, of the second item to the maximum value, in response to the cursor being positioned on the central line of the first item to display the second item as the fourth image;
continuously increasing the opacity of the third image, and continuously decreasing the opacity of the fourth image, as the cursor is moved from the central line of the first item to the central line of the second item; and
changing the opacity of the third image to the maximum value, and changing the opacity of the fourth image to the minimum value, in response to the cursor being positioned on the central line of the second item to display the second item as the third image.

11. The image display method of claim 1, further comprising:
sensing an input for entering a pointing mode; and
displaying the cursor based on the input.

12. The image display method of claim 11, further comprising:
sensing an infrared (IR) signal;
preventing the displaying of the cursor, highlighting the first item, and changing an attribute of the first item from a first value to a second value, based on the IR signal;
sensing another user input for moving the highlight; and
highlighting the second item, changing an attribute of the second item from the first value to the second value, and changing the attribute of the first item from the second value back to the first value, based on a direction of the other user input.

13. The image display method of claim 1,
wherein the varying comprises:
gradually increasing the gaps between the items of the item list arranged in the direction of the movement of the cursor, and
gradually decreasing the gaps between the items of the item list arranged in an opposite direction against the direction of the movement of the cursor.

14. An image display apparatus comprising:
a display configured to display an item list including items represented by images, and a cursor controlled by a user input indicating a movement of a remote control apparatus;
a sensor configured to sense the movement of the user input; and
a processor configured to control the display to:
move the cursor based on the movement of the user input; and
vary gaps between the items of the item list according to a position of the cursor,
wherein the processor is further configured to, based on the position of the cursor being on a first item corresponding to the movement of the user input received from the remote control apparatus, automatically increase a first gap between the first item and a second item adjacent to the first item and automatically increasing a second gap between the first item and a third item adjacent to the first item, and varying the gaps between the items based on a direction of a movement of the cursor, and
wherein the processor is further configured to:
in response to the cursor based on the sensed movement of the user input being positioned on a central line of the first item among the items, change the first gap and the second gap to a maximum gap which adjacent items have, and
according to the cursor moving from the central line of the first item to the third item, gradually reduce a size of the first gap and gradually increase a size of a third gap between the third item and a fourth item adjacent to the third item until the cursor is positioned on a central line of the third item.

15. The image display apparatus of claim 14, wherein the processor is further configured to:
obtain a distance between the cursor and the central line of the first item; and continuously increase the first gap as the distance between the cursor and the central line of the first item becomes smaller.

16. The image display apparatus of claim 14, wherein the processor is further configured to control the display to:
continuously decrease the first gap as the cursor is moved from the central line of the first item.

17. The image display apparatus of claim 14, wherein the processor is further configured to control the display to:
continuously decrease the first gap, and maintain the second gap, as the cursor is moved from the central line of the first item to the central line of the third item; and
change the first gap to a minimum gap in response to the cursor being positioned on the central line of the third item.

18. The image display apparatus of claim 17, wherein the processor is further configured to control the display to:
set a third gap between the third item and the fourth item to the minimum gap in response to the cursor being positioned on the central line of the first item;
continuously increase the third gap as the cursor is moved from the central line of the first item to the central line of the third item; and
change the third gap to the maximum gap in response to the cursor being positioned on the central line of the third item.

19. The image display apparatus of claim 14, wherein the processor is further configured to control the display to change opacity of an image among a plurality of images of the first item based on a positional relationship between the cursor and the first item, wherein the plurality of images of each item of the item list includes at least a first image as a fovea image and a second image as a normal image.

20. The image display apparatus of claim 19, wherein the processor is further configured to control the display to:
change opacity of the first image, among the plurality of images, of the first item to a maximum value in response to the cursor being positioned on the central line of the first item to display the first item as the first image; and
continuously decrease the opacity of the first image as the cursor is moved from the central line of the first item.

21. The image display apparatus of claim 20, wherein the processor is further configured to control the display to:
change opacity of the second image, among the plurality of images, of the first item to a minimum value in response to the cursor being positioned on the central line of the first item; and
continuously increase the opacity of the second image as the cursor is moved from the central line of the first item.

22. The image display apparatus of claim 19, wherein the processor is further configured to control the display to:
change opacity of the first image, among the plurality of images, of the first item to a maximum value, and change opacity of the second image, among the plurality of images, of the first item to a minimum value, in response to the cursor being positioned on the central line of the first item to display the first item as the first image;
continuously decrease the opacity of the first image, and continuously increase the opacity of the second image, as the cursor is moved from the central line of the first item to a central line of the second item; and
change the opacity of the first image to the minimum value, and change the opacity of the second image to the maximum value, in response to the cursor being positioned on the central line of the second item to display the first item as the second image.

23. The image display apparatus of claim 22, wherein the processor is further configured to control the display to:
change opacity of a third image, among the plurality of images, of the second item to the minimum value, and change opacity of a fourth image, among the plurality of images, of the second item to the maximum value, in response to the cursor being positioned on the central line of the first item;
continuously increase the opacity of the third image, and continuously decrease the opacity of the fourth image, as the cursor is moved from the central line of the first item to the central line of the second item; and
change the opacity of the third image to the maximum value, and change the opacity of the fourth image to the minimum value, in response to the cursor being positioned on the central line of the second item.

24. The image display apparatus of claim 14, wherein the sensor is further configured to sense an input for entering a pointing mode, and
the processor is further configured to control the display to display the cursor based on the input.

25. The image display apparatus of claim 24, wherein:
the sensor is further configured to sense an infrared (IR) signal;
the processor is further configured to control the display to prevent the display of the cursor, highlight the first item, and change an attribute of the first item from a first value to a second value, based on the IR signal;
the sensor is further configured to sense another user input for moving the highlight; and
the processor is further configured to control the display to highlight the second item, change an attribute of the second item from the first value to the second value, and change the attribute of the first item from the second value back to the first value, based on a direction of the other user input.

26. An image display apparatus comprising:
a display configured to display an item list including items represented by images, and a cursor controlled by a user input indicating a movement of a remote control apparatus, wherein each of the items of the item list includes a first image as a fovea image and a second image as a normal image;
a sensor configured to sense the movement of the user input; and
a processor configured to control the display to:
move the cursor based on the movement of the user input;
vary gaps between the items according to a position of the cursor; and
change an opacity of a first image of a first item to a maximum value, and change an opacity of a second image of the first item to a minimum value to display the first item as the first image, in response to the cursor being positioned on a central line of the first item;
continuously decrease the opacity of the first image of the first item, and continuously increase the opacity of the second image of the first item to display the first item as a third image obtained by combining the first image and the second image, as the cursor is moved from the central line of the first item to a central line of a second item; and
change the opacity of the first image of the first item to the minimum value, and change the opacity of the second image of the first item to the maximum value to display the first item as the second image, in response to the cursor being positioned on the central line of the second item.

27. The image display apparatus of claim 26, wherein the processor is further configured to control the display to:
continuously decrease the opacity of the first image as the cursor is moved from the central line.

\* \* \* \* \*